US011173931B2

(12) United States Patent
Okamori et al.

(10) Patent No.: US 11,173,931 B2
(45) Date of Patent: Nov. 16, 2021

(54) INFORMATION PROCESSING APPARATUS, INFORMATION PROCESSING METHOD, AND PROGRAM

(71) Applicant: SONY CORPORATION, Tokyo (JP)

(72) Inventors: Atsushi Okamori, Tokyo (JP); Nobuhiro Ogawa, Tokyo (JP); Shigeru Sugaya, Kanagawa (JP); Yuuji Ogihara, Chiba (JP)

(73) Assignee: SONY CORPORATION, Tokyo (JP)

(*) Notice: Subject to any disclaimer, the term of this patent is extended or adjusted under 35 U.S.C. 154(b) by 190 days.

(21) Appl. No.: 16/485,891

(22) PCT Filed: Dec. 18, 2017

(86) PCT No.: PCT/JP2017/045348
§ 371 (c)(1),
(2) Date: Aug. 14, 2019

(87) PCT Pub. No.: WO2018/163560
PCT Pub. Date: Sep. 13, 2018

(65) Prior Publication Data
US 2020/0017132 A1 Jan. 16, 2020

(30) Foreign Application Priority Data
Mar. 6, 2017 (JP) .............................. JP2017-041304

(51) Int. Cl.
*B61L 15/00* (2006.01)
*G01G 19/44* (2006.01)
*H04L 29/08* (2006.01)

(52) U.S. Cl.
CPC .......... *B61L 15/0072* (2013.01); *G01G 19/44* (2013.01); *H04L 67/12* (2013.01)

(58) Field of Classification Search
CPC ........ F24F 11/30; B61L 15/00; B61L 15/0072; B61L 25/02; B61L 12/072;
(Continued)

(56) References Cited

U.S. PATENT DOCUMENTS 5,877,458 A * 3/1999 Flowers .................. G06F 3/045
178/18.01
RE39,881 E * 10/2007 Flowers .................. G06F 3/045
178/18.01
(Continued)

FOREIGN PATENT DOCUMENTS

CN 104598021 A * 5/2015 ............. G06F 3/011
CN 206448556 U * 8/2017 ............... E04H 1/12
(Continued)

*Primary Examiner* — Tung S Lau
(74) *Attorney, Agent, or Firm* — Paratus Law Group, PLLC

(57) ABSTRACT

There is provided an information processing apparatus capable of improving the accuracy of the degree of comfort in another area to be learned by a user, the information processing apparatus including: a comfort degree calculation unit that calculates a degree of comfort of a particular user on the basis of sensor data of another user; and an output control unit that controls such that information regarding the degree of comfort is output to a terminal of the particular user.

20 Claims, 17 Drawing Sheets

(58) Field of Classification Search
CPC ... A61B 5/02405; A61B 5/0059; G06F 3/045; A47C 27/083; G01G 19/44; H04L 67/12; G06Q 50/30
See application file for complete search history.

(56) References Cited

U.S. PATENT DOCUMENTS

| | | | |
|---|---|---|---|
| 2005/0177051 A1* | 8/2005 | Almen | A61B 5/02405 600/509 |
| 2011/0296622 A1* | 12/2011 | Hsu | A47C 27/083 5/713 |
| 2012/0310416 A1* | 12/2012 | Tepper | F24F 11/62 700/276 |
| 2015/0335284 A1* | 11/2015 | Nuovo | A61B 5/0059 600/301 |
| 2016/0187899 A1* | 6/2016 | Lee | F24F 11/0008 236/44 C |

FOREIGN PATENT DOCUMENTS

| | | | | |
|---|---|---|---|---|
| JP | H07-253477 A | * | 10/1995 | G01W 1/17 |
| JP | 2014-164383 A | | 9/2014 | |
| JP | 2015-036836 A | | 2/2015 | |
| JP | 2015-094971 A | | 5/2015 | |
| JP | 2016-094044 A | | 5/2016 | |
| JP | 2016-224719 A | | 12/2016 | |
| WO | WO 2013073372 | * | 5/2013 | F24F 11/30 |

* cited by examiner

FIG. 5

| USER ID | MOVEMENT HISTORY |
|---|---|
| U0 | POSITION P0(T0), POSITION P0(T1), ... |
| U1 | POSITION P1(T0), POSITION P1(T1), ... |
| U2 | POSITION P2(T0), POSITION P2(T1), ... |
| U3 | POSITION P3(T0), POSITION P3(T1), ... |
| U4 | POSITION P4(T0), POSITION P4(T1), ... |
| U5 | POSITION P5(T0), POSITION P5(T1), ... |
| ... | ... |

| | USER GROUP CLOSEST TO USER U0 AMONG USER GROUPS NEAR USER U0 |
|---|---|
| | U1, U2, U3, U4, U5 |

| Y2 LINE BOUND FOR Z2 DIRECTION | STATION POSITION | DEPARTURE TIME (TRAIN T21) | DEPARTURE TIME (TRAIN T22) | |
|---|---|---|---|---|
| Y1 LINE BOUND FOR Z1 DIRECTION | STATION POSITION | DEPARTURE TIME (TRAIN T11) | DEPARTURE TIME (TRAIN T12) | |
| X10 STATION | POSITION R11 | 12:10 | 12:40 | |
| X11 STATION | POSITION R12 | 12:12 | 12:42 | |
| X12 STATION | POSITION R13 | 12:15 | 12:45 | |

| USER ID | EXPECTED BOARDING STATION | EXPECTED BOARDING POSITION |
|---|---|---|
| U0 | X12 STATION | POSITION P0(T1) |

| USER ID | TYPE OF TRAIN | IMMEDIATELY PREVIOUS STOP STATION | LOCATED POSITION AT IMMEDIATELY PREVIOUS STOP STATION |
|---|---|---|---|
| U1 | Y1 LINE BOUND FOR Z1 DIRECTION, LEAVING FROM X12 STATION AT 12:15 | X11 STATION | POSITION P1(T1) |
| U2 | | | POSITION P2(T1) |
| U3 | | | POSITION P3(T1) |
| U4 | | | POSITION P4(T1) |
| U5 | | | POSITION P5(T1) |

FIG. 11

| LOCATED CAR | SENSOR OUTPUT VALUE MEASUREMENT STATION | DEGREE OF COMFORT (FIRST TIME) | DEGREE OF COMFORT (SECOND TIME) | ... | ESTIMATED DEGREE OF COMFORT | TYPE OF TRAIN |
|---|---|---|---|---|---|---|
| FIRST CAR | X11 | 0.4 | ... | ... | 0.3 | Y1 LINE BOUND FOR Z1 DIRECTION, LEAVING FROM X12 STATION AT 12:15 |
| SECOND CAR | | ? | ... | ... | 0.4 | |
| THIRD CAR | | 1.0 | ... | ... | 0.8 | |
| FOURTH CAR | | 0.7 | ... | ... | 0.6 | |
| FIFTH CAR | | 0.5 | ... | ... | 0.4 | |
| SIXTH CAR | | 0.2 | ... | ... | 0.2 | |

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2017/045348 (filed on Dec. 18, 2017) under 35 U.S.C. § 371, which claims priority to Japanese Patent Application No. 2017-041304 (filed on Mar. 6, 2017), which are all hereby incorporated by reference in their entirety.

TECHNICAL FIELD

The present disclosure relates to an information processing apparatus, an information processing method, and a program.

BACKGROUND ART

In recent years, technologies for allowing another user to share the situation of a certain user are known. As an example, a technology is disclosed that allows another user to share the recognition result of a certain user's behavior (see, for example, Patent Document 1). By sharing the recognition result of the behavior in this manner, it is possible for another user to learn the behavior of a certain user. For example, there is a case where another user is interested in the behavior of a certain user.

Meanwhile, there is a demand that a user wants to learn the degree of comfort of an area different from the area where the user is located (hereinafter, also referred to as "another area"). For example, there is a demand that the user wants to learn where the area is, of which the degree of comfort is higher than the degree of comfort of the area where the user is located. In a case where the user learns an area with a higher degree of comfort, for example, the user can move to the area with a higher degree of comfort.

CITATION LIST

Patent Document

Patent Document 1: Japanese Patent Application Laid-Open No. 2015-36836

SUMMARY OF THE INVENTION

Problems to be Solved by the Invention

However, it is generally difficult to improve the accuracy of the degree of comfort in another area to be learned by the user. Therefore, it is desired to provide a technology capable of improving the accuracy of the degree of comfort in another area to be learned by the user.

Solutions to Problems

According to the present disclosure, an information processing apparatus is provided, the information processing apparatus including: a comfort degree calculation unit that calculates a degree of comfort of a particular user on the basis of sensor data of another user; and an output control unit that controls such that information regarding the degree of comfort is output to a terminal of the particular user.

According to the present disclosure, an information processing method is provided, the information processing method including: calculating a degree of comfort of a particular user on the basis of sensor data of another user; and controlling, by a processor, such that information regarding the degree of comfort is output to a terminal of the particular user.

According to the present disclosure, a program is provided, the program causing a computer to function as an information processing apparatus including: a comfort degree calculation unit that calculates a degree of comfort of a particular user on the basis of sensor data of another user; and an output control unit that controls such that information regarding the degree of comfort is output to a terminal of the particular user.

Effects of the Invention

As described above, according to the present disclosure, there is provided a technology capable of improving the accuracy of the degree of comfort in another area to be learned by a user. Note that the above-mentioned effect is not necessarily limited, and any effects indicated in the present description or other effects that can be learned from the present description may be exhibited together with the above-mentioned effect or instead of the above-mentioned effect.

BRIEF DESCRIPTION OF DRAWINGS

FIG. 5 is a diagram for explaining a technique of calculating the type of a train expected to be boarded by a user and an immediately previous stop station of the train.

FIG. 11 is a diagram illustrating an example of the calculation of an estimated degree of comfort.

MODE FOR CARRYING OUT THE INVENTION

Figure 1:
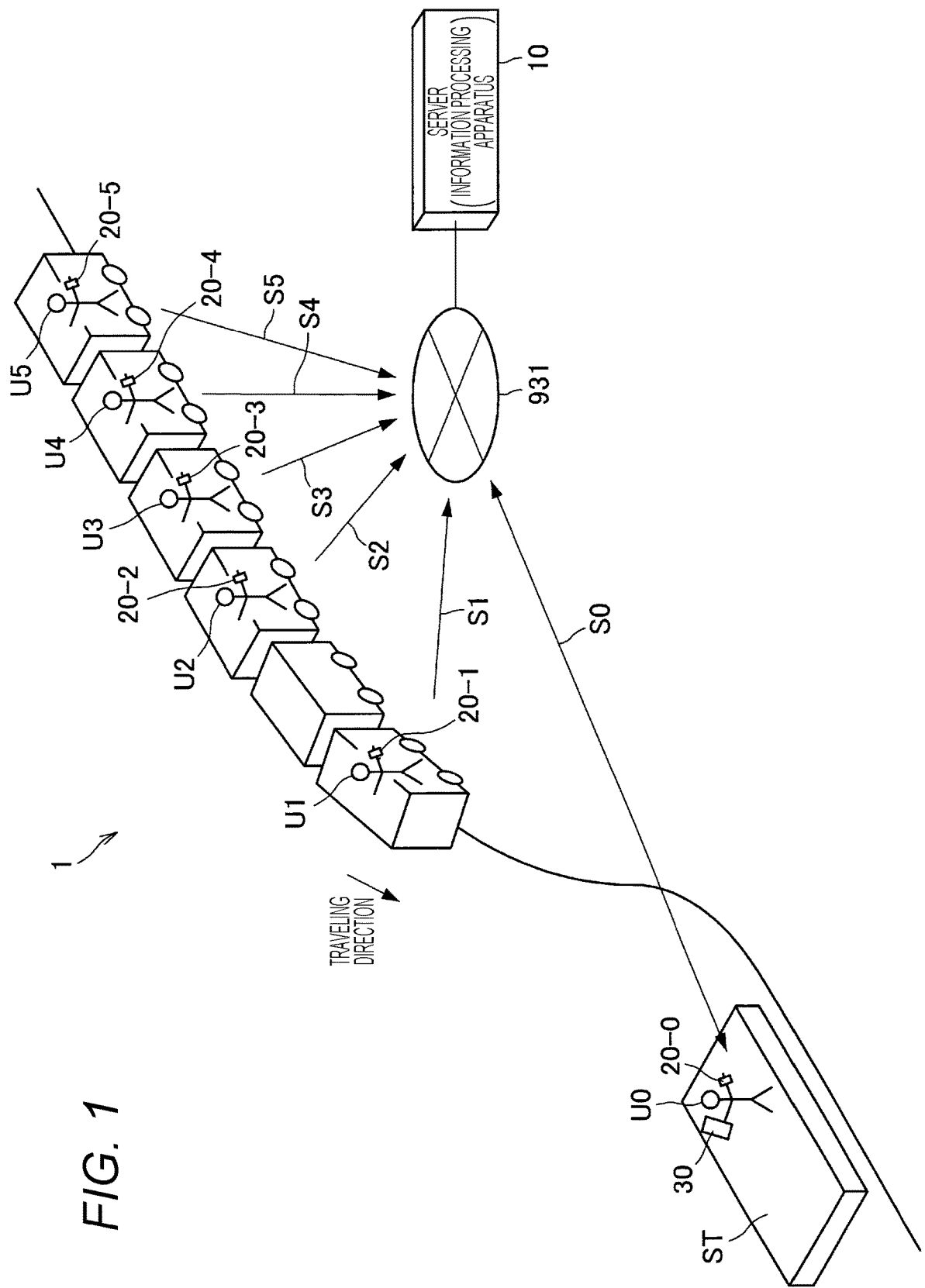
FIG. 1 is a diagram for explaining an example in which a user located at a platform of a station is notified of movement to a more comfortable car.

Hereinafter, favorable embodiments of the present disclosure will be described in detail with reference to the accompanying drawings. Note that, in the present description and the drawings, constituent elements having substantially the same functional configuration will be denoted by the same reference numeral and redundant description will be omitted.

Furthermore, in the present description and the drawings, a plurality of constituent elements having substantially the same or equivalent functional configuration is sometimes distinguished by attaching different numerals after the same reference numeral. However, is a case where it is not necessary to particularly distinguish each of a plurality of constituent elements having substantially the same or equivalent functional configuration, only the same reference numeral is attached. In addition, equivalent constituent elements of different embodiments are sometimes distinguished by attaching different alphabets after the same reference numeral. However, in a case where it is not necessary to particularly distinguish each of equivalent constituent elements, only the same reference numeral is attached.

Note that the description will be given in the following order.

0. Overview
1. Embodiments of Present Disclosure
1.1. Case where User is Located at Platform of Station
1.2. Case where User is Riding on Train
1.3. Hardware Configuration Example
2. Conclusion <0. Overview>

In recent years, technologies for allowing another user to share the situation of a certain user are known. As an example, a technology is disclosed that allows another user to share the recognition result of a certain user's behavior (see, for example, Patent Document 1). By sharing the recognition result of the behavior in this manner, it is possible for another user to learn the behavior of a certain user. For example, there is a case where another user is interested in the behavior of a certain user.

Meanwhile, there is a demand that a user wants to learn the degree of comfort of an area different from the area where the user is located (another area). For example, there is a demand that the user wants to learn where the area is, of which the degree of comfort is higher than the degree of comfort of the area where the user is located. In a case where the user learns an area with a higher degree of comfort, for example, the user can move to the area with a higher degree of comfort.

However, it is generally difficult to improve the accuracy of the degree of comfort in another area to be G by the user. For example, there is a demand for avoiding places with dense crowds, places with poor air quality, and the like. An example of such places is inside a train. While riding a train, there is a demand for avoiding cars with dense crowds and cars with poor air quality. As a technology applicable to such demands, a system for estimating the degree of congestion of a car has been studied.

Reference Document "A Study on a Train Congestion Estimation System Using Infrared Sensors and Carbon Dioxide Sensors"
(https://www.ieice.org/tokyo/gakusei/kenkyuu/14/pdf/53.pd f).

In addition to the degree of congestion as described above, there are demands for smell and noise, and the like. However, environments is which people feel comfortable are diverse, and there is also a variety in what element such as temperature or humidity is regarded as important. Moreover, what element is regarded as important also varies depending on a situation in which the user is placed. For example, what element is regarded as important differs between a case where the user is alone and a case where the user is with a family. Here, a technology for estimating the user's situation is also disclosed.

Reference Document "Technology for Estimating User's Situation"
(https://www.sonynetwork.co.jp/corporation/release/2013/pub20130314_2962.html)

According to such a technology for estimating the user's situation, it is possible to acquire, for example, a state of the user riding on the train, a state of the user riding on the bus, a state of the user sitting, or a state of the user standing.

However, it is generally difficult to determine which of environmental parameters including temperature, humidity, and even the user's situation should be regarded as important to find out whether or not the degree of comfort is high. Moreover, in a case where the result of finding out which environmental parameter is taken as important is incorrect, manually correcting the method of find ng out the environmental parameter to be taken as important takes time for the user. Additionally, in a case where a position with a higher degree of comfort for each user moves every moment, it is generally difficult to notify each user of a position with a higher degree of comfort.

Therefore, in the present description, it is desired to provide a technology capable of improving the accuracy of the degree of comfort in another area to be learned by the user. Furthermore, the present description will propose a technology for finding out a position with a higher degree of comfort according to a plurality of environmental parameters and a situation in which the user is placed, and also automatically updating the method of finding out the degree of comfort depending on the result of the user's behavior. Moreover, the present description will propose a technology that can follow a position with a higher degree of comfort even in a case where the position with a high degree of comfort changes every moment.

Heretofore, the overview of an embodiment of the present disclosure has been described.

<1. Embodiments of Present Disclosure>

[1.1. Case where User is Located at Platform of Station]

Initially, as a first example, an example will be described in which a user located at a platform of a station is notified of movement to a more comfortable car. Hereinafter, although a car of a train is mentioned as an example of an area where a user is located, the area where a user is located is not limited to the car of the train. FIG. 1 is a diagram for explaining an example in which a user located at a platform of a station is notified of movement to a more comfortable car. As illustrated in FIG. 1, a case where a train made up of a plurality of cars is traveling toward a station ST is assumed. A user U0 is waiting for a train at a platform of the station ST. Furthermore, users U1 to U5 are riding on the train.

In the example illustrated in FIG. 1, the number of cars is six, but the number of cars is not limited. Furthermore, in the example illustrated in FIG. 1, the user U1 is on board the leading car, the user U2 is on board the third car, the user U3 is on board the fourth car, the user U4 is on board the fifth car, and the user U5 is on board the sixth car; however, the number of users riding on the train is not limited. Furthermore, there is no limitation on which car each user is riding on.

The user U0 wears a sensor apparatus (hereinafter also referred to as "detection apparatus") 20-0. FIG. 1 illustrates a case where the detection apparatus 20-0 is a bracelet. However, the form of the detection apparatus 20-0 is not particularly limited. For example, the form of the detection apparatus 20-0 may be a necklace type, a head-mounted type, or a glasses type. Alternatively, the detection apparatus 20-0 may be contained in a terminal held by the user U0 (hereinafter also referred to as "presentation apparatus"). Similarly, the users U1 to U5 wear detection apparatuses 20-1 to 20-5.

The detection apparatuses 20-0 to 20-5 have sensors. In the following, an example in which the detection apparatuses 20-0 to 20-5 have position sensors, temperature sensors, humidity sensors, odor sensors, sound sensors, and $CO_2$ sensors will be mainly described. However, the types of sensors included in the detection apparatuses 20-0 to 20-5 are not limited. The detection apparatuses 20-0 to 20-5 each transmit sensor data (hereinafter also referred to as "sensor output values") obtained by the sensors via a network 931 (for example, every predetermined time) to an information processing apparatus (hereinafter also referred to as "server") 10 (S0 to S5).

In the server 10, the degree of comfort of the user U0 in each car is calculated on the basis of the sensor output values obtained from the detection apparatuses 20-0 to 20-5. Then, information regarding the degree of comfort of the user U0 in each car is notified from the server 10 to the presentation apparatus 30 of the user U0 via the network 931 (S0). At this time, in a case where there is a car having a higher degree of comfort than a car expected to be boarded by the user U0, the car having the higher degree is notified from the server 10 to the presentation apparatus 30 of the user U0.

Figure 2:
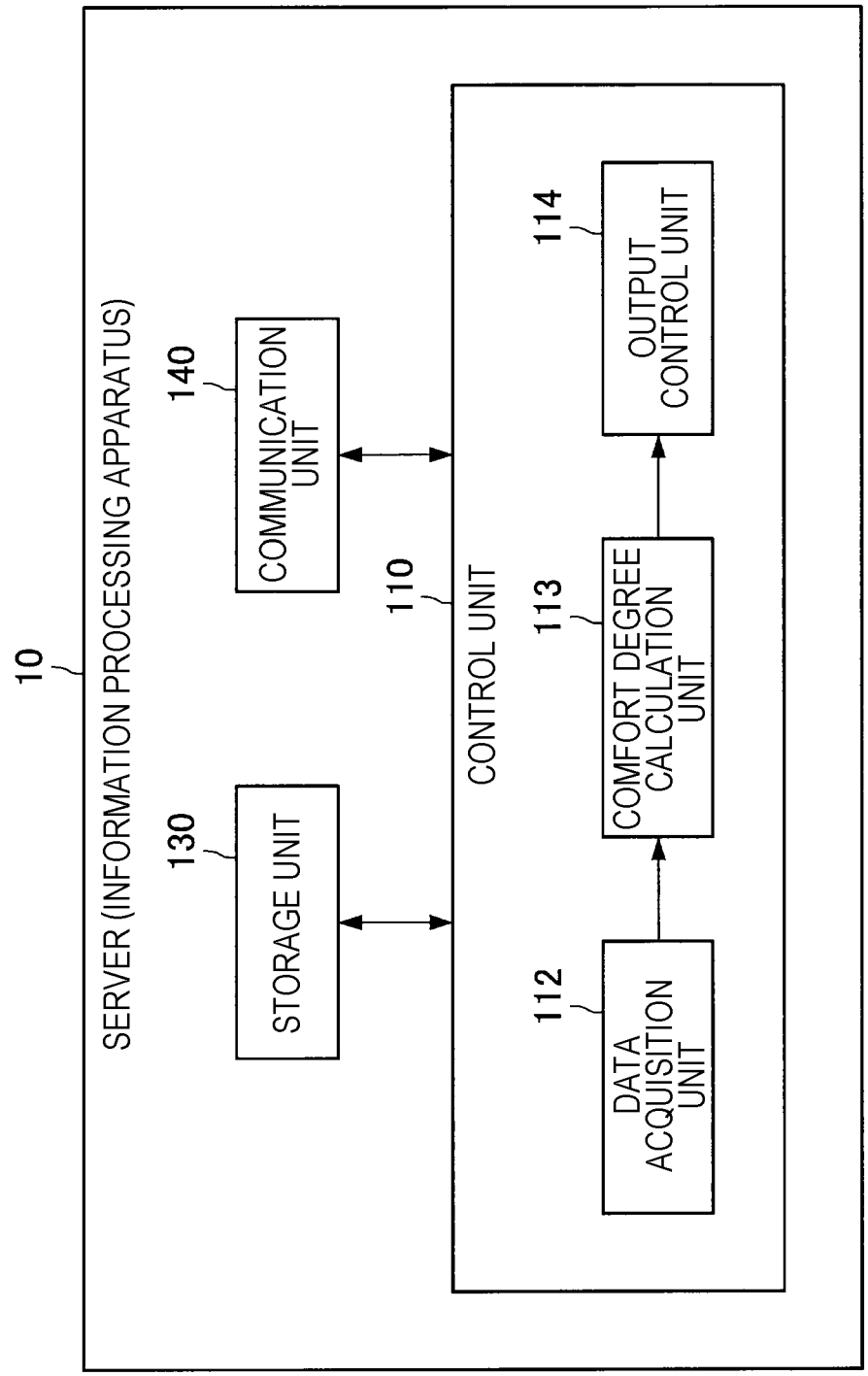
FIG. 2 is a block diagram illustrating a functional configuration example of a server according to an embodiment of the present disclosure.

Subsequently, a functional configuration example of the server 10 according to the embodiment of the present disclosure will be described. FIG. 2 is a block diagram illustrating a functional configuration example of the server 10 according to the embodiment of the present disclosure. As illustrated in FIG. 2, the server 10 includes a control unit 110, a storage unit 130, and a communication unit 140. Hereinafter, these functional blocks included in the server 10 will be described.

The control unit 110 executes control of each unit of the server 10. Note that, for example, the control unit 110 may be configured from one or a plurality of processing units such as central processing units (CPUs). In a case where the control unit 110 is configured from a processing unit such as a CPU, this processing unit may be configured from an electronic circuit. As illustrated in FIG. 2, the control unit 110 has a data acquisition unit 112, a comfort degree calculation unit 113, and an output control unit 114. These blocks included in the control unit 110 will be described in detail later.

The storage unit 130 is configured with a memory included and is a recording device that stores a program executed by the control unit 110 and stores data necessary for the execution of the program. Furthermore, the storage unit 130 temporarily stores data for computation by the control unit 110. Note that the storage unit 130 may be a magnetic storage unit device, a semiconductor storing device, an optical storing device, or a magneto-optical storing device.

The communication unit 140 is configured with a communication circuit included and has a function of communicating with another apparatus via the network 931 (FIG. 1). For example, the communication unit 140 is configured from a communication interface. For example, the communication unit 140 is capable of communicating with the detection apparatus 20 and the presentation apparatus 30 via the network 931 (FIG. 1).

Heretofore, the functional configuration example of the server 10 according to the embodiment of the present disclosure has been described.

Figure 3:
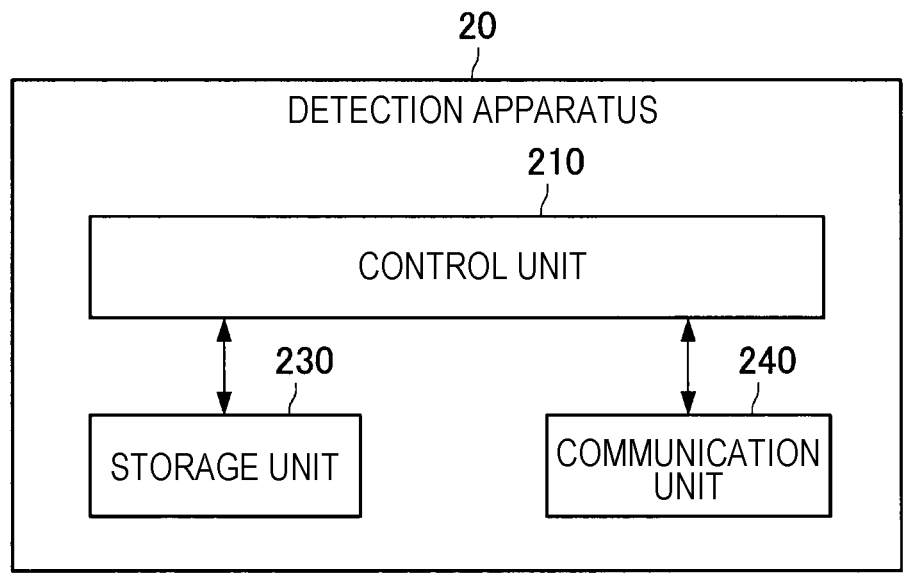
FIG. 3 is a block diagram illustrating a functional configuration example of a detection apparatus according to the embodiment.

Subsequently, a functional configuration example of the detection apparatus 20 according to the embodiment of the present disclosure will be described. FIG. 3 is a block diagram illustrating a functional configuration example of the detection apparatus 20 according to the embodiment of the present disclosure. As illustrated in FIG. 3, the detection apparatus 20 includes a control unit 210, a storage unit 230, and a communication unit 240 in addition to the above-described sensors. Hereinafter, these functional blocks included in the detection apparatus 20 will be described.

The control unit 210 executes control of each unit of the detection apparatus 20. Note that, for example, the control unit 210 may be configured from one or a plurality of processing units such as central processing units (CPUs). In a case where the control unit 210 is configured from a processing unit such as a CPU, this processing unit may be configured from an electronic circuit.

The storage unit 230 is configured with a memory included and is a recording device that stores a program executed by the control unit 210 and stores data necessary for the execution of the program. Furthermore, the storage unit 230 temporarily stores data for computation by the control unit 210. Note that the storage unit 230 may be a magnetic storage unit device, a semiconductor storing device, an optical storing device, or a magneto-optical storing device.

The communication unit 240 is configured with a communication circuit included and has a function of communicating with another apparatus via the network 931 (FIG. 1). For example, the communication unit 240 is configured from a communication interface. For example, the communication unit 240 is capable of communicating with the server 10 via the network 931 (FIG. 1). Alternatively, the communication unit 240 may be capable of communicating with the server 10 via a terminal.

Heretofore, a functional configuration example of the detection apparatus 20 according to the embodiment of the present disclosure has been described.

Figure 4:
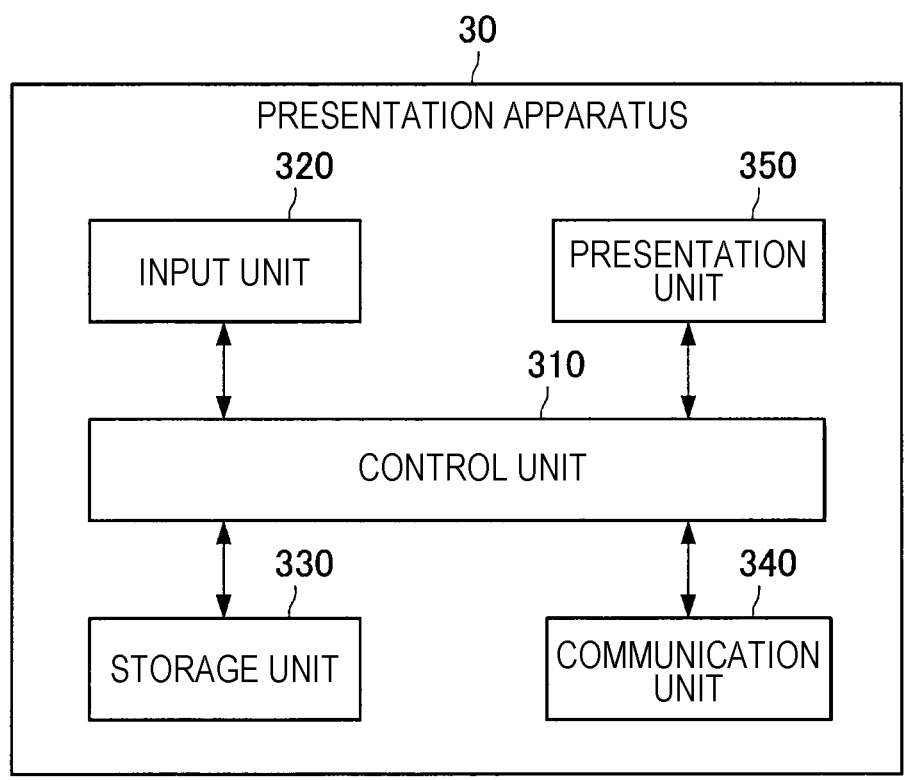
FIG. 4 is a block diagram illustrating a functional configuration example of a presentation apparatus according to the embodiment.

Subsequently, a functional configuration example of the presentation apparatus 30 according to the embodiment of the present disclosure will be described. FIG. 4 is a block diagram illustrating a functional configuration example of the presentation apparatus 30 according to the embodiment of the present disclosure. As illustrated in FIG. 4, the presentation apparatus 30 includes a control unit 310, an input unit 320, a storage unit 330, a communication unit 340, and a presentation unit 350. Hereinafter, these functional blocks included in the presentation apparatus 30 will be described.

The control unit 310 executes control of each unit of the presentation apparatus 30. Note that, for example, the control unit 310 may be configured from one or a plurality of processing units such as central processing units (CPUs). In a case where the control unit 310 is configured from a processing unit such as a CPU, this processing unit may be configured from an electronic circuit.

The input unit 320 has a function of accepting an input of an operation by the user U0. For example, the input unit 320 may include a mouse, a keyboard, a touch panel, a switch, a lever, and the like. Furthermore, the input unit 320 may include a microphone that detects the voice of the user U0.

The storage unit 330 is configured with a memory included and is a recording device that stores a program executed by the control unit 310 and stores data necessary for the execution of the program. Furthermore, the storage unit 330 temporarily stores data for computation by the control unit 310. Note that the storage unit 330 may be a magnetic storage unit device, a semiconductor storing device, an optical storing device, or a magneto-optical storing device.

The communication unit 340 is configured with a communication circuit included and has a function of communicating with another apparatus via the network 931 (FIG. 1). For example, the communication unit 240 is configured from a communication interface. For example, the communication unit 340 is capable of communicating with the server 10 via the network 931 (FIG. 1).

The presentation unit 350 outputs various types of information. For example, the presentation unit 350 may include a display capable of providing a view that can be visually recognized by the user U0 and the display may be a liquid crystal display or an organic electro-luminescence (EL) display. Furthermore, the presentation unit 350 may include a voice output apparatus such as a speaker. Alternatively, the presentation unit 350 may include a tactile presentation apparatus that presents a tactile sensation to the user U0.

Heretofore, a functional configuration example of the presentation apparatus 30 according to the embodiment of the present disclosure has been described.

Subsequently, a technique of calculating the type of train and the immediately previous stop station in the server 10, on the basis of the movement history of each user and information regarding the train will be described. Note that the type of train is information that specifies a train and is generally called "train number". FIG. 5 is a diagram for explaining a technique of calculating the type of a train expected to be boarded by the user U0 and an immediately previous stop station of the train. In the server 10, the data acquisition unit 112 acquires sensor output values of the respective users.

For example, as illustrated in FIG. 5, position information on each user acquired by the data acquisition unit 112 is accumulated in the server 10 as the movement history of each user. For example, the movement history of the user U0 contains a position P0 of the user U0 at time T0. Meanwhile, the information regarding the train includes stop stations and station positions for each train line (for example, an Y1 line bound for a Z1 direction or the like). Furthermore, the information regarding the train includes the departure time of each train at each station.

Initially, in a case where there is a station position that matches the position of the user U0, the comfort degree calculation unit 113 can detect that the user U0 is located at the matched station, on the basis of the position information on the user U0 and the station position. Then, on the basis of the movement history, the comfort degree calculation unit 113 can specify a user group closest to the user U0, from among user groups near the user U0. In the example illustrated in FIG. 5, the comfort degree calculation unit 113 specifies the users U1 to U5 as such a user group.

Furthermore, the comfort degree calculation unit 113 can specify the type of a train in which the users U1 to U5 are located and the immediately previous stop station, on the basis of the station position, the departure time, and the movement history of each user. In the example illustrated in FIG. 5, the type of the train in which the users U1 to U5 are located is specified as "Y1 line bound for Z1 direction, leaving from X12 station at 12:15". Note that the comfort degree calculation unit 113 may calculate the arrival time of the train in which the users U1 to U5 are located, from map (latitude and longitude) information on the route and the moving speeds of the users U1 to U5, to calculate the departure time on the basis of the calculation result. Furthermore, the immediately previous stop station of the users U1 to U5 is specified as "X11 station".

In addition, the comfort degree calculation unit 113 can specify the latest position information on the user U0 located at the station ST as an expected boarding position. The comfort degree calculation unit 113 can also specify an expected boarding station as "X12 station" on the basis of the latest position information on the user U0 located at the station ST and the station position.

Figure 6:
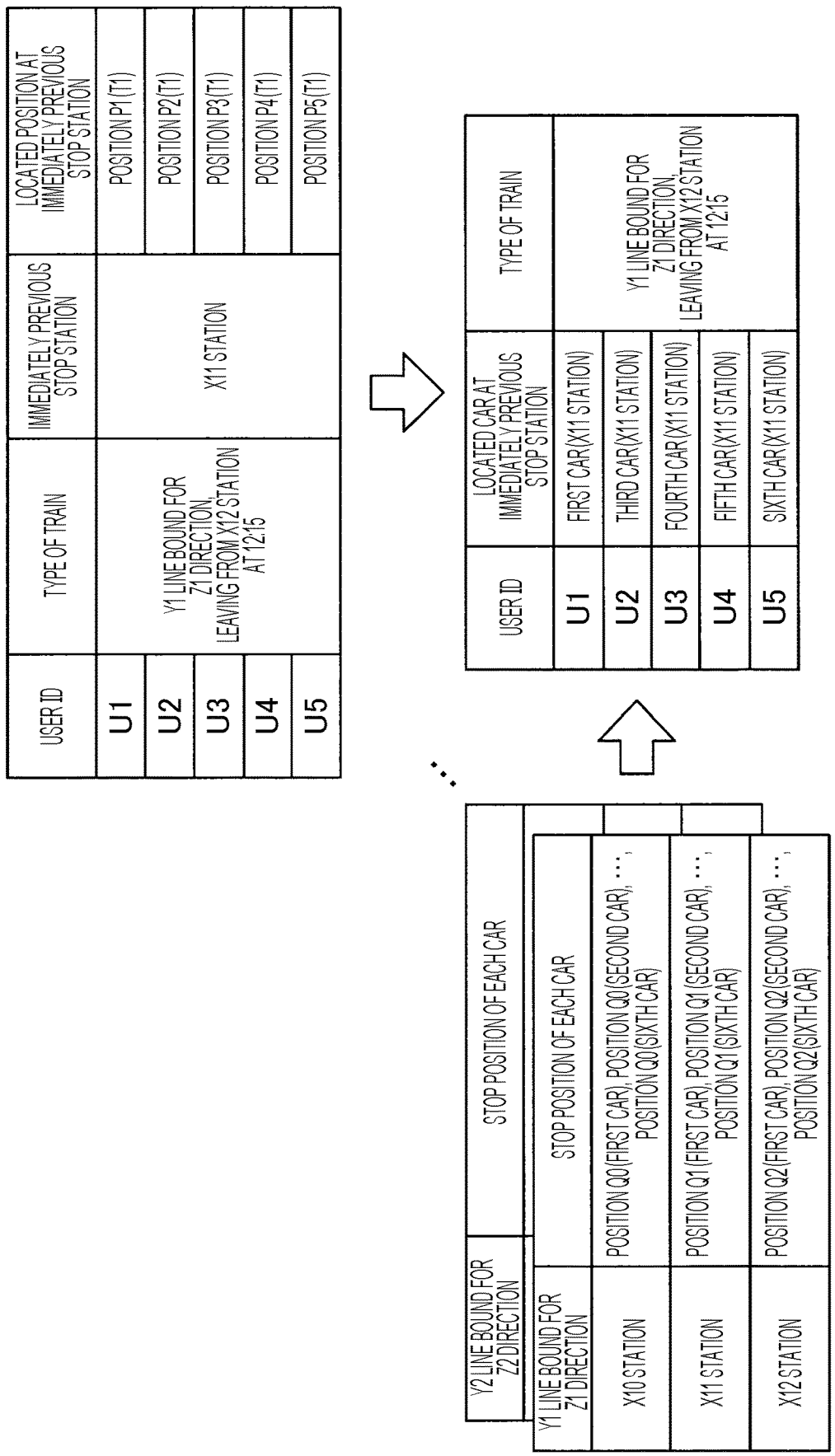
FIG. 6 is a diagram for explaining a technique of specifying a located car of each user at a stop station.

Subsequently, a technique of specifying a located car of each user at the stop station in the server 10, on the basis of the located position of each user at the immediately previous stop station and the stop positron of each car at the station will be described. FIG. 6 is a diagram for explaining a technique of specifying the located car of each user at the stop station. As illustrated in FIG. 6, the information regarding the train includes the stop position of each car at each station for each train line (for example, the Y1 line bound for the Z1 direction or the like). Therefore, in the server 10, the comfort degree calculation unit 113 can specify the located car of each user at the stop station on the basis of the located position of each user at the immediately previous stop station and the stop position of each car at the station.

Figure 7:
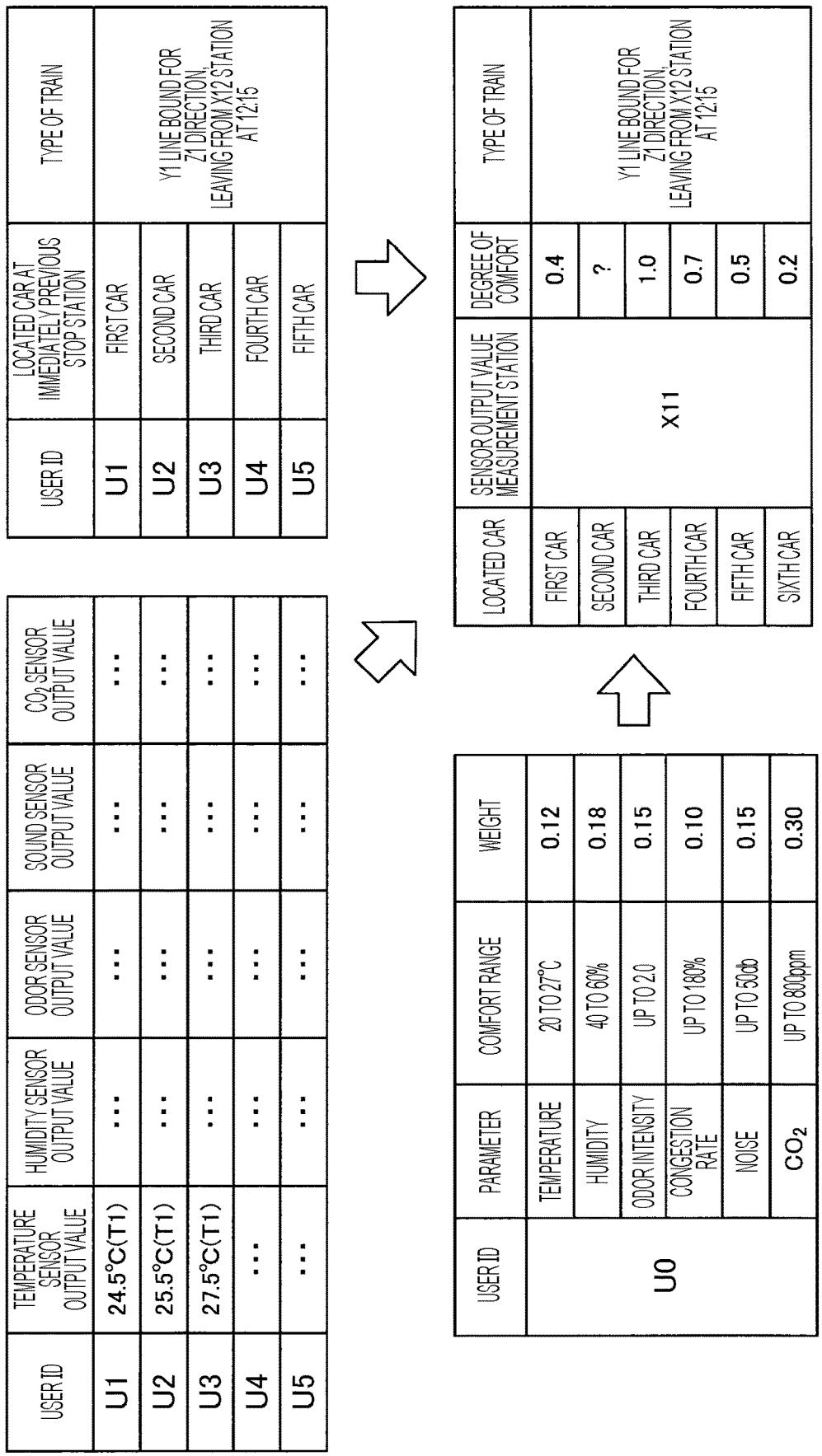
FIG. 7 is a diagram for explaining a calculation example of the degree of comfort of a user in each car.

Subsequently, a calculation example of the degree of comfort of the user U0 in each car will be described. FIG. 7 is a diagram for explaining a calculation example of the degree of comfort of the user U0 in each car. The comfort degree calculation unit 113 calculates the degree of comfort of the user U0 on the basis of the sensor output values of the users U1 to U5. Then, the output control unit 114 controls such that the calculated degree of comfort (or information regarding the degree of comfort) is output to the presentation apparatus 30 of the user U0 via the communication unit 140.

Here, as illustrated in FIG. 7, it is assumed that a weight and a comfort range are associated with the user U0 for each parameter according to the sensor output value (for example, the entire sensor output value or a value calculated from the sensor output value). For example, the comfort degree calculation unit 113 calculates the degree of comfort on the basis of the sensor output values of the users U1 to U5 and the weight associated with the user U0. For example, the comfort degree calculation unit 113 calculates the degree of comfort of the user U0 on the basis of a distance from the comfort range to the parameter according to the sensor output values of the users U1 to U5 and the weight associated with the user U0. More specifically, the comfort degree calculation unit 113 can calculate the degree of comfort of the user U0 by (mathematical formula 1) and (mathematical formula 2).

[Mathematical Formula 1]

$$\text{Difference Value} = \frac{|\text{Difference between Parameter and Most Recent Comfort Range Boundary Value}|}{\text{Most Recent Comfort Range Boundary Value}} \quad \text{(Mathematical Formula 1)}$$

[Mathematical Formula 2]

$$\text{Degree of Comfort} = 1 - \sum_{k=1}^{n} \text{Difference Value} \cdot \text{Weight of Parameter} \quad \text{(Mathematical Formula 2)}$$

Here, n denotes the number of parameters and is designated as six in the example illustrated in FIG. 7. For example, the degree of comfort is calculated as described above for each located car at the immediately previous stop station. For example, in the example illustrated in FIG. 7, the degree of comfort of the first car is calculated as "0.4", the degree of comfort of the second car is not calculated because no user is located in the second car, and the degree of comfort of the third car is calculated as "1.0". Furthermore, the degree of comfort of the fourth car is calculated as "0.7", the degree of comfort of the fifth car is calculated as "0.5", and the degree of comfort of the sixth car is calculated as "0.2".

Note that, although a case where at most one user is located in each car has been indicated here, there is a case where a plurality of users is located in each car. Accordingly, in such a case, the comfort degree calculation unit 113 only needs to calculate the representative value of the degrees of comfort of the plurality of respective users for each car. For example, the representative value of the degrees of comfort may be a median value, a frequent value, or an average value.

Figure 8:
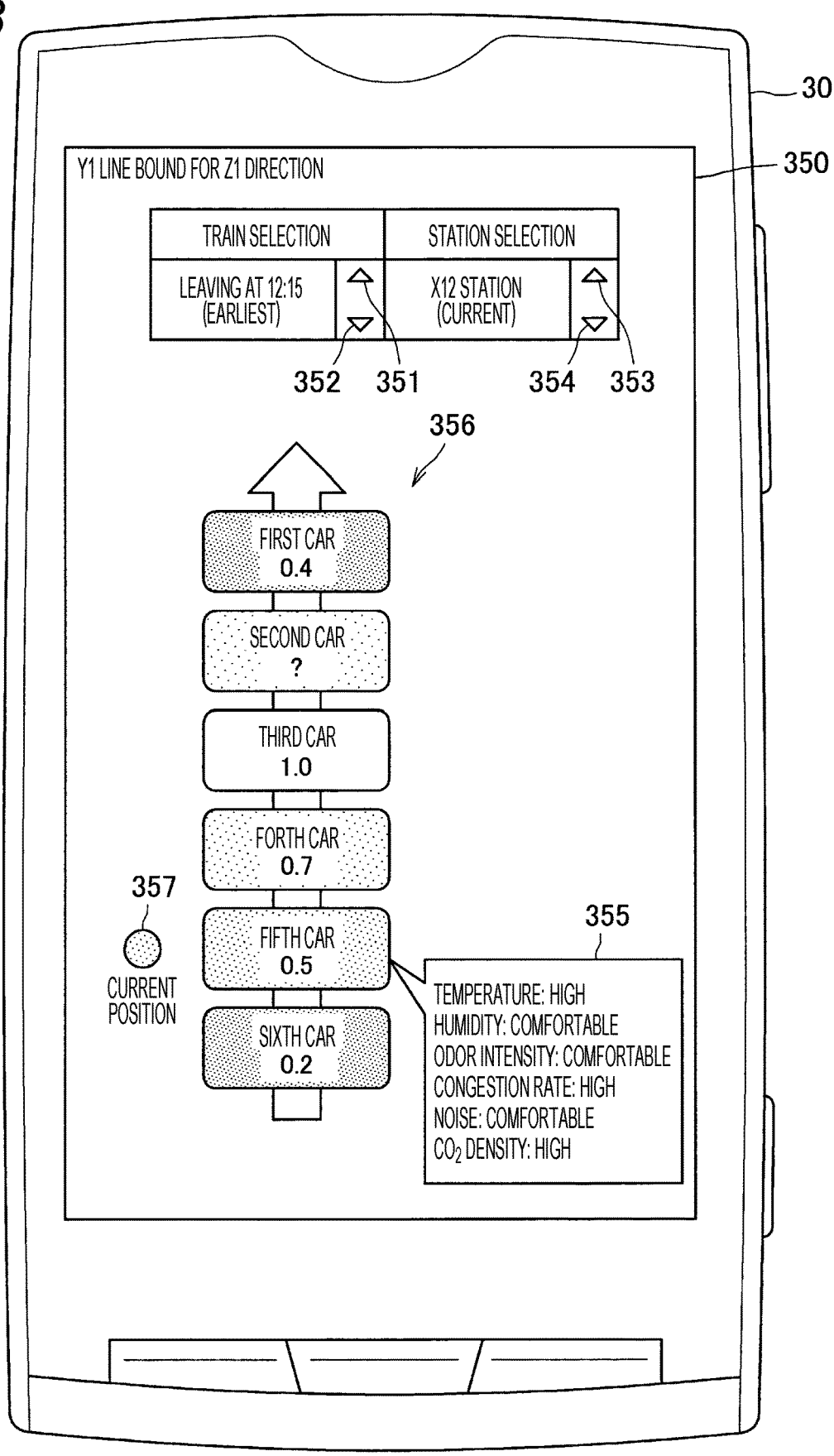
FIG. 8 is a diagram illustrating an example of the presentation of the degree of comfort for each located car.

Subsequently, the output control unit 114 controls such that the located cars of the sensors of the users U1 to U5 are associated with the degrees of comfort and output to the presentation apparatus 30. FIG. 8 is a diagram illustrating an example of the presentation of the degree of comfort for each located car. Referring to FIG. 8, the degree of comfort for each located car is presented by the presentation unit 350. For example, by presenting the degree of comfort "0.4" in the frame of the first car, the located car and the degree of comfort are presented in association with each other. Furthermore, "?" is presented in the frame of the second car for which the degree of comfort has not been calculated.

Furthermore, referring to FIG. 8, a car having a higher degree of comfort is presented in a brighter color. In this manner, the visibility is improved by presenting variations of the degrees of comfort stepwise by color. In addition, the presentation unit 350 presents a car 357 expected to be boarded by the user U0 as the current position of the user U0. For example, the output control unit 114 can specify the car expected to be boarded by the user U0 on the basis of the expected boarding position of the user U0 (FIG. 5) and the stop position of each car (FIG. 6). In the example illustrated in FIG. 8, the car expected to be boarded by the user U0 is specified as "fifth car".

Furthermore, in the example illustrated in FIG. 8, the presentation unit 350 presents the degree of comfort 355 for each parameter. In this manner, the output control unit 114 may control such that the degree of comfort 355 for each parameter is output to the presentation apparatus 30. For example, as illustrated in FIG. 8, the degree of comfort for each parameter may be indicated by which stage the degree of comfort belongs to, or may be indicated by a numerical value. Note that the degree of comfort for each parameter can be calculated on the basis of, for example, the multiplication of the difference value in (mathematical formula 2) by the parameter.

Furthermore, in the example illustrated in FIG. 8, a comfort degree presentation button 351 for the directly previous train, a comfort degree presentation button 352 for the directly next train, a comfort degree presentation button 353 for the directly previous station, a comfort degree presentation button 354 for the directly next station are presented. By selecting these buttons, the user U0 can switch a train for which the degree of comfort is presented, or switch a station for which the degree of comfort is presented.

Moreover, two pieces of the position information have a predetermined relationship between the user U0 and the user UA (the car expected to be boarded by the user U0 and the located car of the user U4 are both the same "fifth car"). In such a case, it is suitable that, in a case where a difference obtained by subtracting the degree of comfort "0.5" of "fifth car" from the degree of comfort "1.0" of the located car "third car" of another user (for example, the user U2) exceeds a threshold value, the output control unit 114 control such that predetermined notification information is output to the presentation apparatus 30. When such notification information is output to the presentation apparatus 30, the user U0 can notice the presence of a car having a higher degree of comfort. The notification information may be presented by voice or may be presented visually.

At this time, the output control unit 114 may control the threshold value according to a situation in which the user U0 is placed. The situation in which the user U0 is placed may be the state of the user U0 or may be the schedule of the user U0. Furthermore, the output control unit 114 updates the threshold value in a case where the behavior result of the user U0 satisfies a predetermined condition. For example, in a case where it is detected that the user U0 has moved to the located car "third car" of another user (for example, the user U2) (for example, despite accepting no presentation of the notification information), the output control unit 114 may update the threshold value (for example, the notification information may be ensured to be more promptly notified by reducing the threshold value).

In addition, in a case where the situation in which the user U0 is placed is a first situation, the output control unit 114 may set the threshold value to a predetermined value. Although the predetermined value is not limited, for example, the predetermined value may be designated as zero in order to ensure that the notification information is more promptly notified. The first situation may be a state in which the user U0 is located at the platform of the station ST.

Furthermore, the output control unit 114 may control the threshold value on the basis of a cost corresponding to the type of the train expected to be boarded by the user U0. For example, the output control unit 114 may raise the threshold value for a higher cost (the notification information may be ensured to be notified less promptly). The cost is not particularly limited. For example, the cost may include various fees for getting on an applicable type of train (for example, a boarding fee, a fee for a reserved seat, and the like).

In addition, the output control unit 114 may control the threshold value on the basis of the tightness of schedule of the user U0. For example, the output control unit 114 may raise the threshold value for a tighter schedule (the notification information may be ensured to be notified less promptly).

Furthermore, the first situation may be a state in which the user U0 is riding on the train. In addition, the first situation may be a state in which a person located in the vicinity of the user U0 is a predetermined person (for example, a child or the like). Note that whether or not a child is located in the vicinity of the user U0 may be determined on the basis of a known technology. For example, as a known technology, there is a technology utilizing a stray sensor using Bluetooth (registered trademark).

Reference Document "Stray Sensor" (http://www.kingjim.co.jp/sp/maigohimo/index.html)

Furthermore, the output control unit 114 may control the threshold value on the basis of the remaining boarding time to the destination of the user U0. For example, the output control unit 114 may raise the threshold value for a shorter remaining boarding time (the notification information may be ensured to be notified less promptly). The remaining boarding time may be calculated in any way. As an example, the output control unit 114 acquires the search history of transfer guide service and works out whether or not the search result of the current day or the previous day includes a path on which the user U0 is currently moving.

Next, the output control unit 114 can calculate, as the remaining boarding time to the train getting-off station, an average value between a time required from the station directly before the current position to the train getting-off station and a time required from the next station to the train getting-off station. Alternatively, the output control unit 114 may determine the train getting-off station from the commuting path in a life log, instead of the search history of the transfer guide service.

Furthermore, the output control unit 114 may control the threshold value on the basis of the product purchase history of the user U0. Alternatively, the output control unit 114 may control the threshold value on the basis of a person located in the vicinity of the user U0.

For example, in a case where the situation in which the user U0 is placed is a predetermined second situation, the output control unit 114 may control such that the notification information is not output to the presentation apparatus 30. The second situation may be a state in which the tightness of schedule of the user U0 exceeds predetermined tightness, or a state in which a predetermined period has not elapsed since the user U0 purchased a predetermined product (this is because, for example, in a case where a state in which a predetermined period has not elapsed since the purchase of a book is detected on the basis of the product buying history, there is a possibility that the user U0 wants to read the book without moving), or a state in which a cost corresponding to the type of a train expected to be boarded by the user U0 is higher than a predetermined cost.

Figure 9:
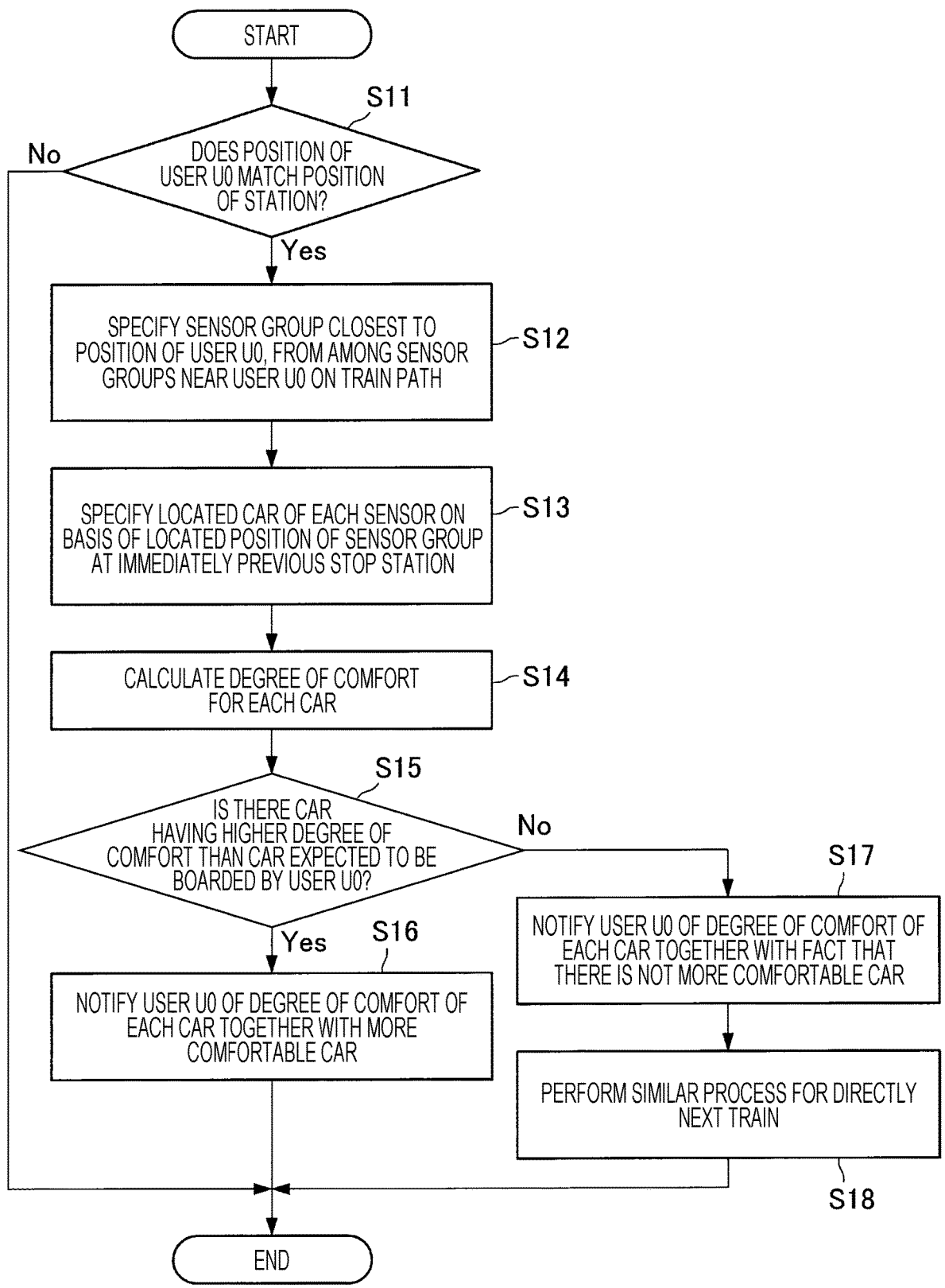
FIG. 9 is a flowchart illustrating an example of an action of an information processing system according to a case where a user is located at a platform of a station.

Subsequently, an example of an action of the information processing system 1 according to a case where the user U0 is located at a platform of a station will be described. FIG. 9 is a flowchart illustrating an example of an action of the information processing system 1 according to a case where the user U0 is located at a platform of a station. Note that the flowchart illustrated in FIG. 9 only illustrates an example of an action in a case where the user U0 is located at a platform of a station. Accordingly, the action in a case where the user U0 is located at a platform of a station is not limited to the action example of the flowchart illustrated in FIG. 9.

Initially, in a case where the position of the user U0 matches the position of the station ST ("Yes" in S11), the comfort degree calculation unit 113 specifies a sensor group closest to the position of the user U0, from among sensor groups near the user U0 on the train path (S12). Then, the comfort degree calculation unit 113 specifies the located car of each sensor on the basis of the located position of the sensor group at the immediately previous stop station (S13). Furthermore, the comfort degree calculation unit 113 calculates the degree of comfort for each car (S14).

In a case where there is a car having a higher degree of comfort, than the car expected to be boarded by the user U0 ("Yes" in S15), the output control unit 114 notifies the user U0 of the degree of comfort of each car together with the more comfortable car (S16). On the other hand, in a case where there is no car having a higher degree of comfort than the car expected to be boarded by the user U0 ("No" in S15), the output control unit 114 notifies the user U0 of the degree of comfort of each car together with the fact that there is not a more comfortable car (S1). Then, a similar process is executed by the server 10 for the directly next train (S18).

Heretofore, an example of an action of the information processing system 1 according to a case where the user U0 is located at a platform of a station has been described.

Figure 10:
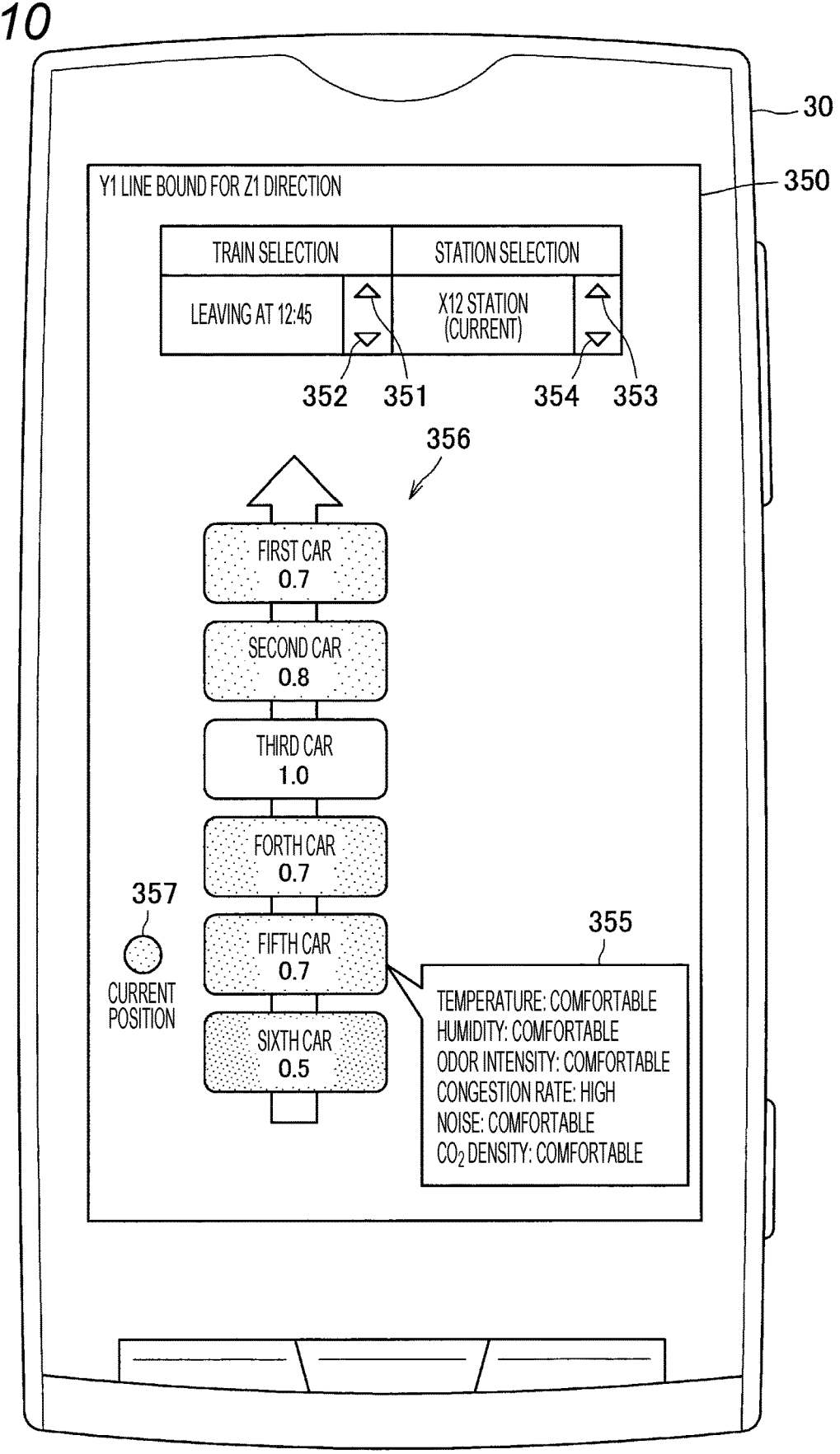
FIG. 10 is a diagram illustrating an example of presentation in a case where a train is selected.

FIG. 10 is a diagram illustrating an example of presentation in a case where a train is selected. The example illustrated in FIG. 10 assumes a case where the comfort degree presentation button 352 for the directly next train is selected by the user U0 in the example illustrated in FIG. 8. At this time, the degree of presentation presented by the presentation unit 350 is updated from the example illustrated in FIG. 8. In this manner, the user U0 can also refer to the degree of comfort of the directly next train.

When the degree of comfort is calculated in this manner, the degree of comfort is accumulated for each type and each car of the train. In such a case, the comfort degree calculation unit 113 can also estimate the future degree of comfort on the basis of the accumulated degrees of comfort for each type and each car of the train. FIG. 11 is a diagram illustrating an example of the calculation of an estimated degree of comfort. As illustrated in FIG. 11, the comfort degree calculation unit 113 can also estimate, as the future degree of comfort, the representative value (for example, the average value, the mode value, the middle value, or the like) of the degrees of comfort accumulated for each type and each car of the train.

Figure 12:
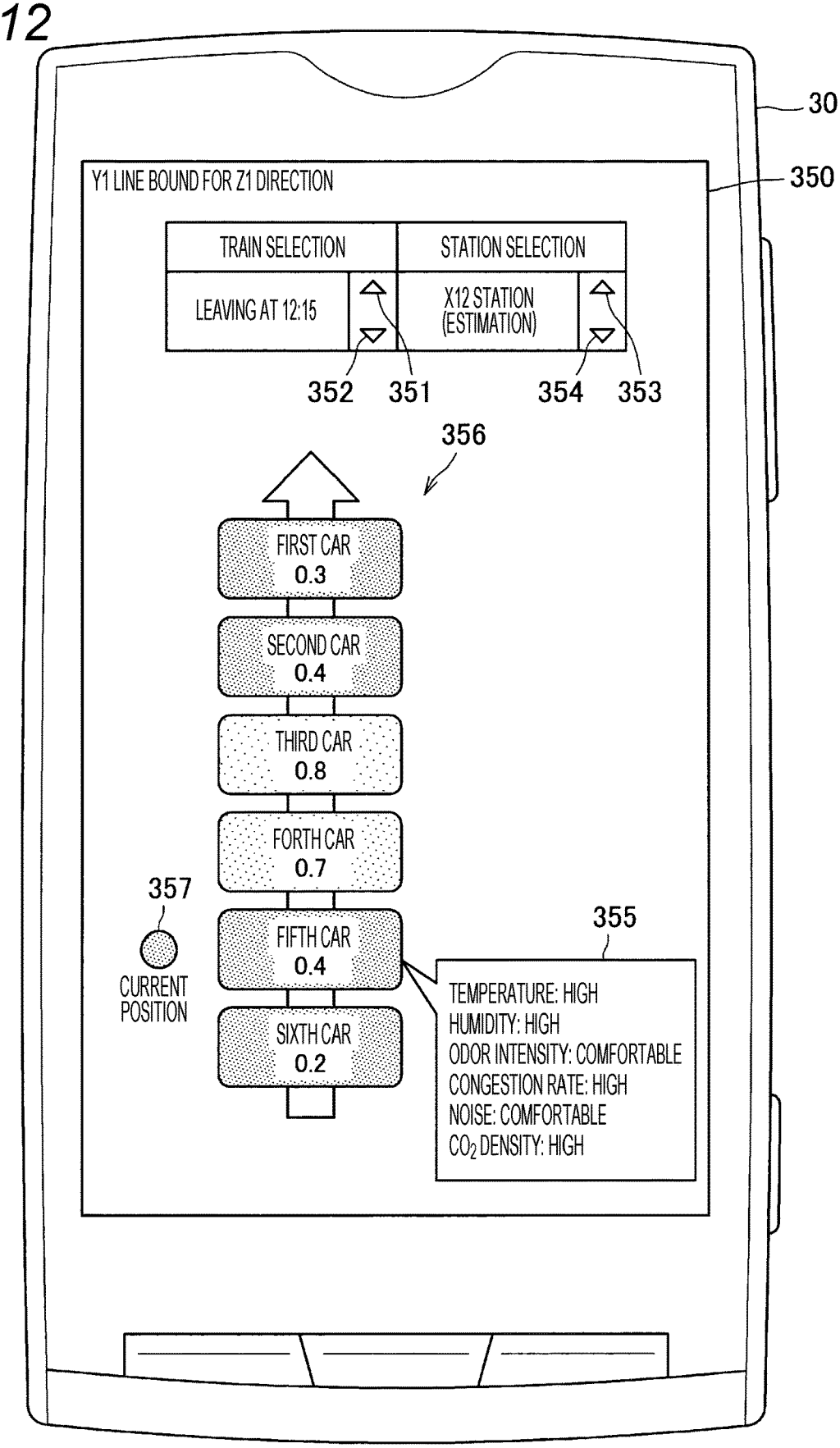
FIG. 12 is a diagram illustrating arm example of presentation in a case where a station is selected.

FIG. 12 is a diagram illustrating an example of presentation in a case where a station is selected. The example illustrated in FIG. 12 assumes a case where the comfort degree presentation button 354 for the directly next station is selected by the user U0 in the example illustrated in FIG. 8. At this time, the degree of presentation presented by the presentation unit 350 is updated from the example illustrated in FIG. 8. In this manner, the user U0 can also refer to the estimated value of the degree of comfort of the same train at the directly next station.

Heretofore, an example in which the user U0 located at a platform of a station is notified of movement to a more comfortable car has been described.

[1.2. Case where user is Riding on Train]

Figure 13:
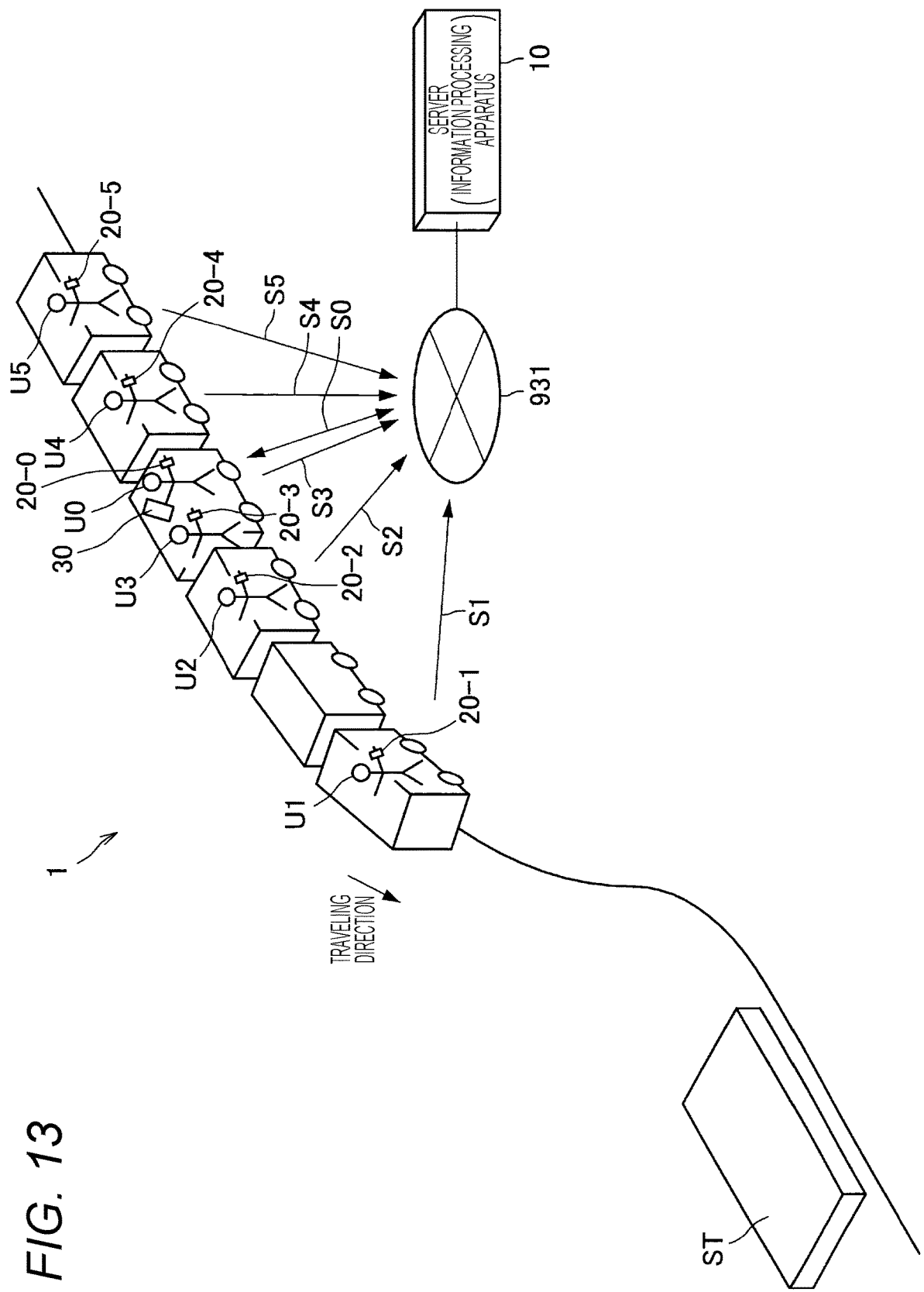
FIG. 13 is a diagram for explaining an example in which a user riding on a train is notified of movement to a more comfortable car.

As a second example, an example in which a user riding on a train is notified of movement to a more comfortable car will be described. FIG. 13 is a diagram for explaining an example in which a user riding on a train is notified of movement to a more comfortable car. As illustrated in FIG. 13, a case where a train made up of a plurality of cars is traveling toward the station ST is assumed, as in the example illustrated in FIG. 1. The user U0 is riding in the fourth car from the front of the train. Other assumptions are similar to the example illustrated in FIG. 1.

Figure 14:
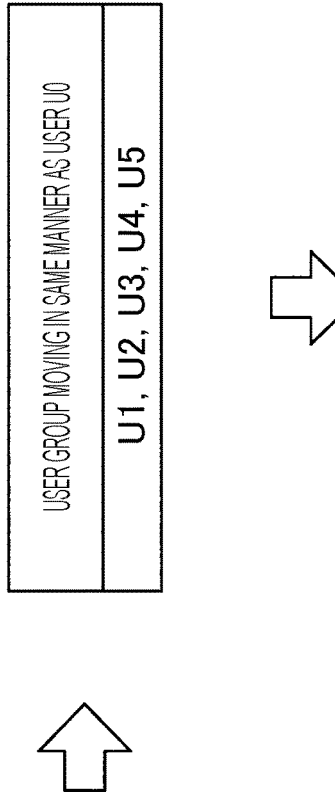
FIG. 14 is a diagram for explaining a technique of calculating the type of a train on which each user is riding and an immediately previous stop station of the train.

FIG. 14 is a diagram for explaining a technique of calculating the type of a train on which the users U0 to U5 are riding and an immediately previous stop station of the train. Initially, the comfort degree calculation unit 113 can detect whether or not the user U0 is moving on the train path, on the basis of the position information on the user U0 and the station position. Then, on the basis of the movement history, the comfort degree calculation unit 113 can specify a user group moving in the same manner as the user U0. In the example illustrated in FIG. 14, the comfort degree calculation unit 113 specifies the users U1 to U5 as such a user group.

Figure 15:
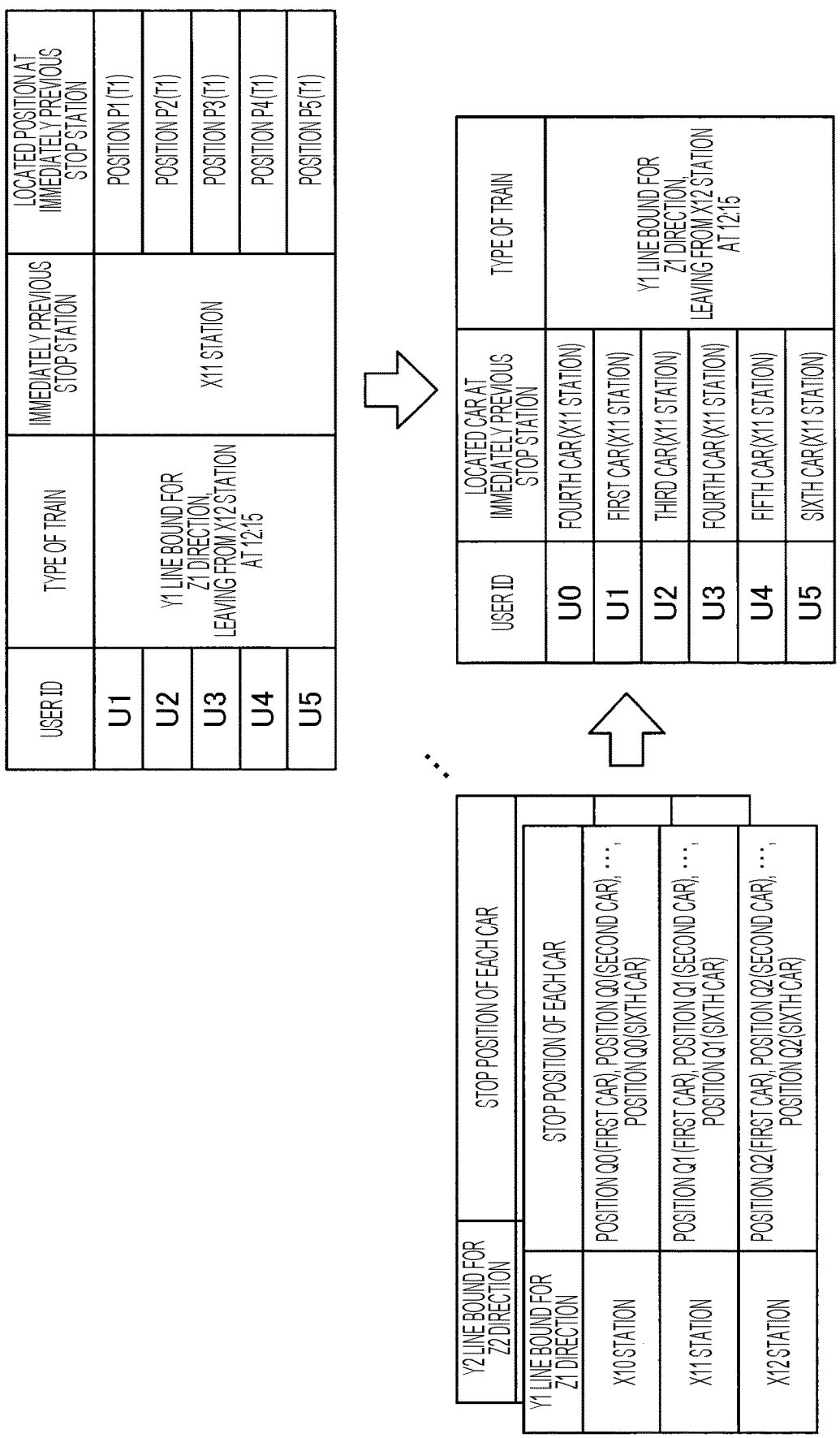
FIG. 15 is a diagram for explaining a technique of specifying a located car of each user at a stop station.

Subsequently, a technique of specifying a located car of each user at the stop station in the server 10, on the basis of the located position of each user at the immediately previous stop station and the stop position of each car at the station will be described. FIG. 15 is a diagram for explaining a technique of specifying a located car of each user at a stop station. As illustrated in FIG. 15, in the server 10, the comfort degree calculation unit 113 can specify the located car of each user at the stop station on the basis of the located position of each user at the immediately previous stop station and the stop position of each car at the station. The calculation of the degree of comfort and the like can be carried out similarly to a case where the user is located at the platform of the station.

Figure 16:
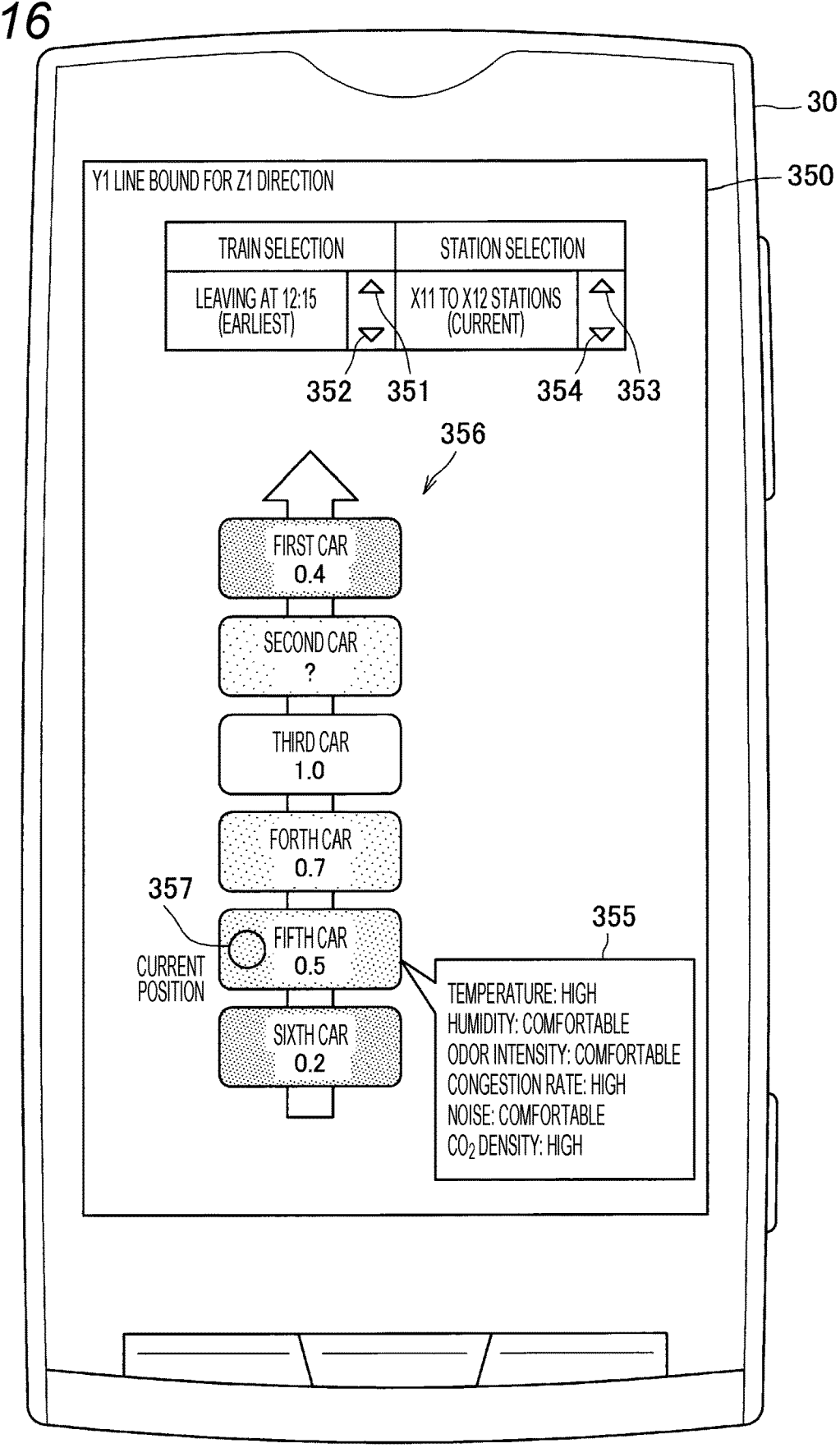
FIG. 16 is a diagram illustrating an example of the presentation of the degree of comfort for each state located car.

Subsequently, the output control unit 114 controls such that the located cars of the sensors of the users U0 to U5 are associated with the degrees of comfort and output, to the presentation apparatus 30. FIG. 16 is a diagram illustrating an example of the presentation of the degree of comfort for each located car Referring to FIG. 16, the current position of the user U0 and the degree of comfort for each located car is presented by the presentation unit 350. For example, by presenting the degree of comfort "0.4" in the frame of the first car, the located car and the degree of comfort are presented in association with each other. Furthermore, "?" is presented in the frame of the second car for which the degree of comfort has not been calculated.

Furthermore, referring to FIG. 8, a car having a higher degree of comfort is presented in a brighter color. In this manner, the visibility is improved by presenting variations of the degrees of comfort stepwise by color. In addition, the presentation unit 350 presents a located car 357 of the user U0 as the current position of the user U0.

Furthermore, in the example illustrated in FIG. 16, a comfort degree presentation button 353 for the directly previous section and a comfort degree presentation button 354 for the directly next section are presented. By selecting these buttons, the user U0 can switch a section for which the degree of comfort is presented.

Moreover, two pieces of the position information have a predetermined relationship between the user U0 and the user P4 (the located car of the user U0 and the located car of the user U4 are both the same "fifth car"). In such a case, it is suitable that, in a case where a difference obtained by subtracting the degree of comfort "0.5" of "fifth car" from the degree of comfort "1.0" of the located car "third car" of another user (for example, the user U2) exceeds a threshold value, the output control unit 114 control such that predetermined notification information is output to the presentation apparatus 30. When such notification information is output to the presentation apparatus 30, the user U0 can notice the presence of a car having a higher degree of comfort.

At this time, the output control unit 114 may control the threshold value according to a situation in which the user U0 is placed. For example, the output control unit 114 may control the threshold value on the basis of the posture of the user U0 in the train.

Furthermore, for example, in a case where the situation in which the user U0 is placed is a predetermined second situation, the output, control unit 114 may control such that the notification information is not, output to the presentation apparatus 30. The second situation may be a state in which the estimated reaching time at the destination of the user U0 is later than the time according to the event start time, or a state in which the user U0 has a predetermined posture (for example, a posture of sitting down) in the train, or a state in which the remaining boarding time to the destination of the user U0 is shorter than a predetermined time.

Furthermore, a part or all of weights corresponding to the plurality of respective sensors may be updated dynamically. For example, in a case where the behavior result of the user U0 satisfies a predetermined condition, the output control unit 114 may update a part or all of the weights corresponding to the plurality of respective sensors. More specifically, in a case where it is detected that the user U0 has moved to the located car "third car" of another user (for example, the user U2), the output control unit 114 may update a weight corresponding to a parameter that has changed in a direction in which the degree of comfort increases in correspondence to a change from the degree of comfort of the car expected to be boarded by the user U0 to the degree of comfort of the located car "third car" of the another user (for example, the user U2).

Note that the movement destination car of the user U0 in the train may be detected in any way. For example, in a case where it is detected that the user U0 is walking as the movement of the user U0 in the train, the movement destination car may be detected on the basis of the degree of congestion of the train and the walking speed of the user U0.

Figure 17:
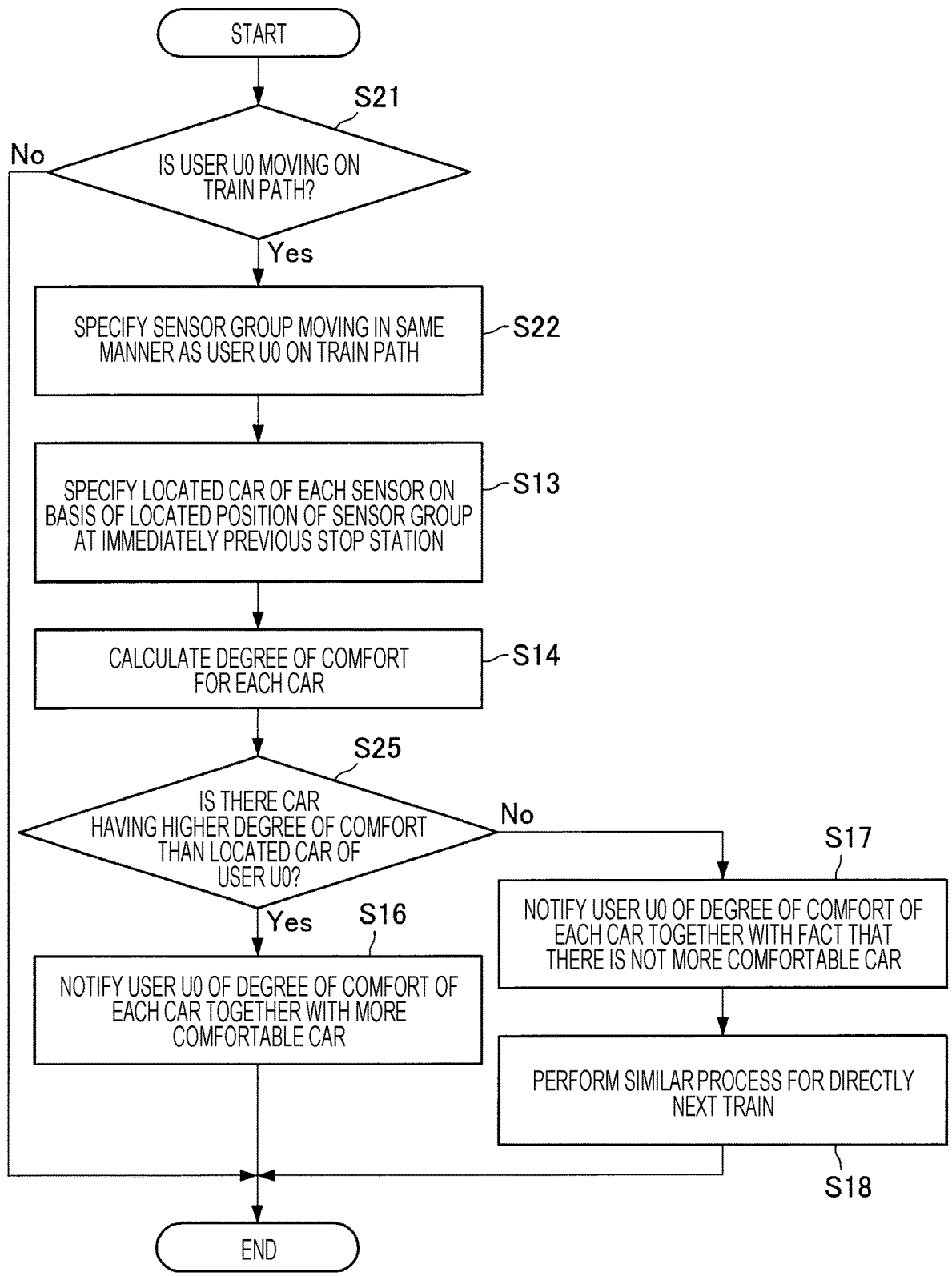
FIG. 17 is a flowchart illustrating an example of an action of the information processing system according to a case where a user is riding on a train.

Subsequently, an example of an action of the information processing system 1 according to a case where the user U0 is riding on a train will be described. FIG. 17 is a flowchart illustrating an example of an action of the information processing system 1 according to a case where the user U0 is riding on a train. Note that the flowchart illustrated in FIG. 17 only illustrates an example of an action in a case where the user U0 is riding on a train. Accordingly, the action in a case where the user U0 is riding on a train is not limited to the action example of the flowchart illustrated in FIG. 17.

Initially, in a case where the user U0 is moving on a train path ("Yes" in S21), the comfort degree calculation unit 113 specifies a sensor group moving in the same manner as the user U0 on the train path (S22). S13 and S14 are carried out similarly to a case where the user U0 is located at a platform of a station.

In a case where there is a car having a higher degree of comfort than the located car of the user U0 ("Yes" in S25), the output control unit 114 notifies the user U0 of the degree of comfort of each car together with the more comfortable car (S16). On the other hand, in a case where there is no car having a higher degree of comfort than the located car of the user U0 ("No" in S15), the output control unit 114 notifies the user U0 of the degree of comfort of each car together with the fact that there is not a more comfortable car (S17). Then, a similar process is executed by the server 10 for the directly next train (S18).

Heretofore, an example of an action of the information processing system 1 according to a case where the user U0 is riding on a train has been described.

[1.3. Hardware Configuration Example]

Figure 18:
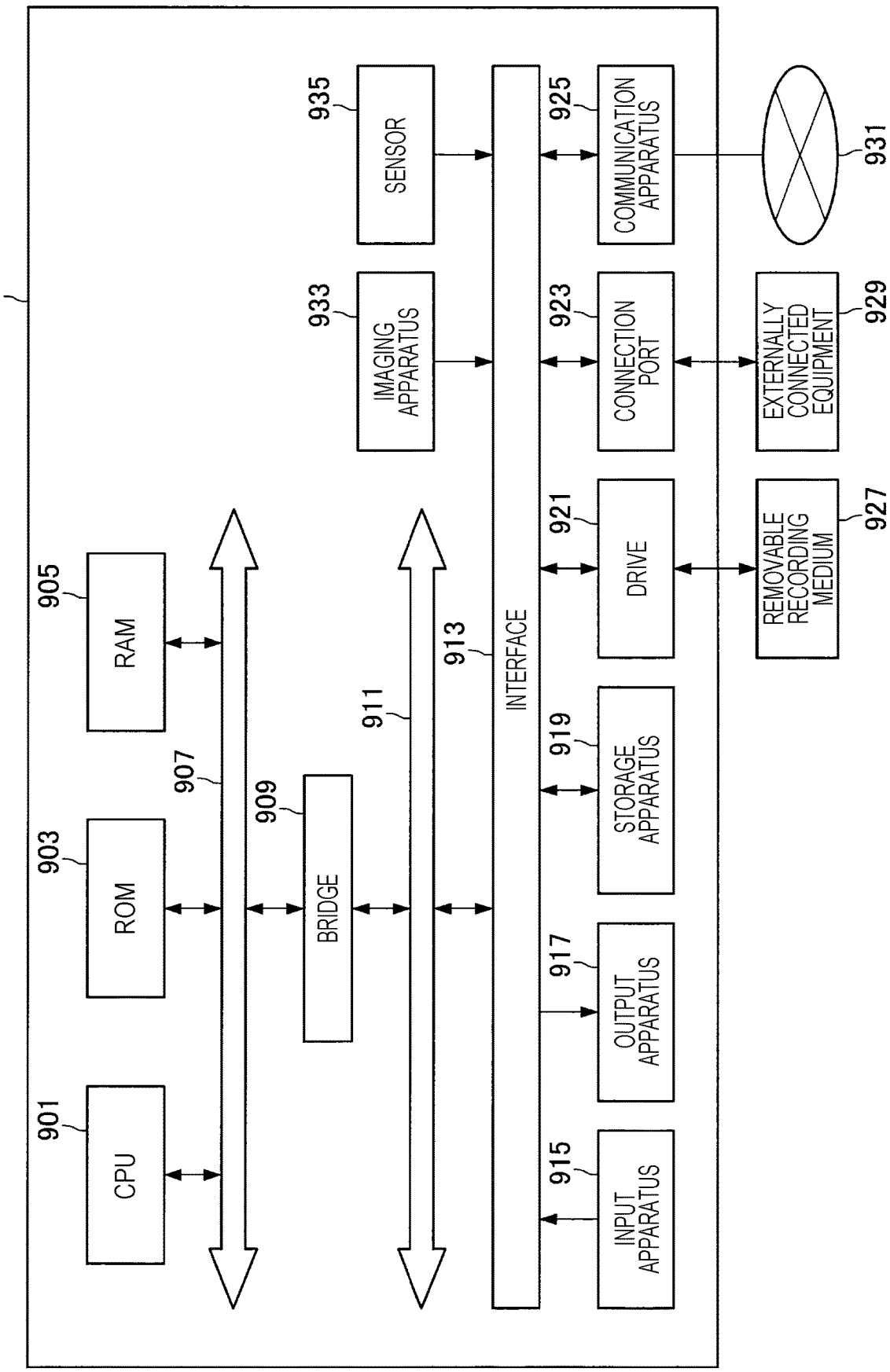
FIG. 18 explains a hardware configuration of an information processing apparatus according to an embodiment of the present disclosure.

Next, a hardware configuration of an information processing apparatus 10 according to the embodiment of the present disclosure will be described with reference to FIG. 18. FIG. 18 is a block diagram illustrating a hardware configuration example of the information processing apparatus 10 according to the embodiment of the present disclosure.

As illustrated in FIG. 18, the information processing apparatus 10 includes a central processing unit (CPU) 901, a read only memory (ROM) 903, and a random access memory (RAM) 905. The control unit 110 can be implemented by the CPU 901, the ROM 903, and the RAM 905. Furthermore, the information processing apparatus 10 may include a host bus 907, a bridge 909, an external bus 911, an interface 913, an input apparatus 915, an output apparatus 917, a storage apparatus 919, a drive 921, a connection port 923, and a communication apparatus 925. Moreover, the information processing apparatus 10 may include an imaging apparatus 933 and a sensor 935 as needed. Instead of or together with the CPU 901, the information processing apparatus 10 may have a processing circuit called a digital signal processor (DSP) or an application specific integrated circuit (ASIC).

The CPU 901 functions as an arithmetic processing unit and a control apparatus and controls the overall action in the information processing apparatus 10 or a part of the action in accordance with various programs recorded in the ROM 903, the RAM 905, the storage apparatus 919, or a removable recording medium 927. The ROM 903 stores programs, computation parameters, and the like used by the CPU 901. The RAM 905 temporarily stores programs used in the execution of the CPU 901, parameters and the like that appropriately change during the execution. The CPU 901, the ROM 903, and the RAM 905 are mutually connected by the host bus 907 configured from an internal bus such as a CPU bus. Moreover, the host bus 907 is connected to the external bus 911 such as a peripheral component interconnect/interface (PCI) bus via the bridge 909.

The input apparatus 915 is, for example, an apparatus operated by the user, such as a button. The input apparatus 915 may include a mouse, a keyboard, a touch panel, a switch, a lever, and the like. Furthermore, the input apparatus 915 may include a microphone that detects the voice of the user. For example, the input apparatus 915 may be a remote controlling apparatus utilizing infrared rays or other electrical waves, or may be externally connected equipment 929 such as a mobile phone compatible with the operation of the information processing apparatus 10. The input apparatus 915 includes an input control circuit that generates an input signal on the basis of information input by the user and outputs the generated input signal to the CPU 901. The user operates this input apparatus 915 to input various types of data to the information processing apparatus 10 or instruct the information processing apparatus 10 on processing actions. Furthermore, the imaging apparatus 933, which will be described later, can also function as an input apparatus by imaging the motion of the hand of the user, the finger of the user, and the like. At this time, the pointing position may be found out according to the motion of the hand or the orientation of the finger.

The output apparatus 917 is configured from an apparatus capable of visually or audibly notify the user of the acquired information. The output apparatus 917 may be, for example, a viewing apparatus such as a liquid crystal display (LCD) or an organic electro-luminescence (EL) display, a sound output apparatus such as a speaker or a headphone, or the like. Furthermore, the output apparatus 917 may include a plasma display panel (PDP), a projector, a hologram, a printer apparatus, and the like. The output apparatus 917 outputs a result obtained by the process by the information processing apparatus 10 as text or a video such as an image or outputs the result as a sound such as voice or acoustics. Furthermore, the output apparatus 917 may include a tight or the like for brightening the surroundings.

The storage apparatus 919 an apparatus for keeping data configured as an example of the storage unit of the information processing apparatus 10. The storage apparatus 919 is configured from, for example, a magnetic storing device such as a hard disk drive (HDD), a semiconductor storing device, an optical storing device, a magneto-optical storing device, or the like. This storage apparatus 919 keeps programs and various types of data executed by the CPU 901, various types of data acquired from the outside, and the like.

The drive 921 is a reader/writer for the removable recording medium 927 such as a magnetic disk, an optical disc, a magneto-optical disk, or a semiconductor memory, and is incorporated in or externally attached to the information processing apparatus 10. The drive 921 reads information recorded on the mounted removable recording medium 927 and outputs the read information to the RAM 905. Furthermore, the drive 921 writes a record in the mounted removable recording medium 927.

The connection port 923 is a port for connecting equipment straight to the information processing apparatus 10. The connection port 923 can be, for example, a universal serial bus (USB) port, an Institute of Electrical and Electronic Engineers (IEEE) 1394 port, a small computer system interface (SCSI) port, or the like. Furthermore, the connection port 923 may be a recommended standard (RS)-232C port, an optical audio terminal, a high-definition multimedia interface (HDMT) (registered trademark) port, or the like. By connecting the externally connected equipment 929 to the connection port 923, various types of data can be exchanged between the information processing apparatus 10 and the externally connected equipment 929.

The communication apparatus 925 is, for example, a communication interface configured from a communication device or the like for connecting to the network 931. The communication apparatus 925 can be, for example, a communication card for a wired or wireless local area network (LAN), Bluetooth (registered trademark), wireless USB (WUSB), or the like. Furthermore, the communication apparatus 925 may be a router for optical communication, a router for asymmetric digital subscriber line (ADSL), a modem for various communications, or the like. For example, the communication apparatus 925 transmits and receives signals and the like to and from the Internet and other communication equipment, using a predetermined protocol such as transmission control protocol/Internet protocol (TCP/IP). In addition, the network 931 connected to the communication apparatus 925 is a network connected in a wired or wireless manner and is, for example, the Internet, a home LAN, infrared communication, radio wave communication, satellite communication, or the like. Note that the communication unit 140 described above can be implemented by the communication apparatus 925.

The imaging apparatus 933 is an apparatus that images a real space using various members including an imaging element such as a charge coupled device (CCD) or complementary metal oxide semiconductor (CMOS) and a lens or the like for controlling imaging of a subject image on the imaging element, and generates a captured image. The imaging apparatus 933 may capture a still image or may capture a moving image.

The sensor 935 serves as, for example, various sensors such as a distance measuring sensor, an acceleration sensor, a gyro sensor, a geomagnetic sensor, a vibration sensor, an optical sensor, and a sound sensor. The sensor 935 acquires information regarding the environment around the information processing apparatus 10, including information regarding the state of the entire information processing apparatus 10, such as the attitude of the casing of the information processing apparatus 10, the brightness and noise around the information processing apparatus 10, and the like. Furthermore, the sensor 935 may include a global positioning system (GPS) sensor that receives a GPS signal and measures the latitude, longitude, and altitude of the apparatus.

<2. Conclusion>

As described thus far, according to the embodiment of the present disclosure, an information processing apparatus is provided, the information processing apparatus including: a comfort degree calculation unit that calculates a degree of comfort of a particular user on the basis of sensor data of another user; and an output control unit that controls such that information regarding the degree of comfort is output to a terminal of the particular user. When such an information processing apparatus is provided, it becomes possible to provide a technology capable of improving the accuracy of the degree of comfort in another area to be learned by the user.

The favorable embodiments of the present disclosure have been described in detail thus far with reference to the accompanying drawings. However, the technological scope of the present disclosure is not limited to these examples. It is clear that a person with average knowledge on the technological field of the present disclosure can arrive at various variations or modifications within a range of the technological spirit disclosed in claims and as a matter of course, these are comprehended as part of the technological scope of the present disclosure.

Furthermore, the effects described in the present description are merely illustrative or exemplary and are not limiting. That is, the technology according to the present disclosure can exhibit other effects obvious to those skilled in the art from the description of the present description together with the above-described effects or instead of the above-described effects.

Note that configurations as described below are also within the technological scope of the present disclosure.

(1)

An information processing apparatus including:

a comfort degree calculation unit that calculates a degree of comfort of a particular user on a basis of sensor data of another user; and an output control unit that controls such that information regarding the degree of comfort is output to a terminal of the particular user.

(b2)

The information processing apparatus according to (1) above, in which a weight is associated with the particular user, and the comfort degree calculation unit calculates the degree of comfort on a basis of sensor data of the another user and the weight associated with the particular user.

(3)

The information processing apparatus according to (2) above, the information processing apparatus further including a data acquisition unit that acquires position information on a sensor of the another user, in which the output control unit controls such that information regarding an area where the sensor of the another user is located is output to the terminal in association with the degree of comfort.

(4)

The information processing apparatus according to (1) above, in which the comfort degree calculation unit calculates a first degree of comfort of the particular user on a basis of sensor data of a first user, and a second degree of comfort of the particular user on a basis of sensor data of a second user.

(5)

The information processing apparatus according to (4) above, the information processing apparatus further including a data acquisition unit that acquires position information on a sensor of the first user and position information on a sensor of the second user, in which the output control unit controls such that information regarding an area where the sensor of the first user is located is output to the terminal in association with the first degree of comfort, and controls such that information regarding an area where the sensor of the second user is located is output to the terminal in association with the second degree of comfort.

(6)

The information processing apparatus according to (4) above, the information processing apparatus further including a data acquisition unit that acquires position information on the particular user, position information on a sensor of the first user, and position information on a sensor of the second user, in which in a case where the position information on the particular user and the position information on the first user have a predetermined relationship, and a difference obtained by subtracting the first degree of comfort from the second degree of comfort exceeds a threshold value, the output control unit controls such that notification information that is predetermined is output to the terminal.

(7)

The information processing apparatus according to (6) above, in which the output control unit controls the threshold value according to a situation in which the particular user is placed.

(8)

The information processing apparatus according to (7) above, in which the output control unit updates the threshold value in a case where a behavior result of the particular user satisfies a predetermined condition.

(9)

The information processing apparatus according to (8) above, in which the output control unit updates the threshold value in a case where it is detected that the particular user has moved to an area where the sensor of the second user is located.

(10)

The information processing apparatus according to (7) above, in which the output control unit sets the threshold value to a predetermined value in a case where a situation in which the particular user is placed is a first situation.

(11)

The information processing apparatus according to (10) above, in which the first situation includes a state in which the particular user is located at a platform of a station, a state in which the particular user is riding on a train, or a state in which a person located in a vicinity of the particular user is a predetermined person.

(12)

The information processing apparatus according to (7) above, in which the output control unit controls the threshold value on a basis of at least one of a remaining boarding time to a destination of the particular user, a cost corresponding to a type of a train expected to be boarded by the particular user, tightness of schedule of the particular user, a product purchase history of the particular user, a person located in a vicinity of the particular user, or a posture of the particular user in a train.

(13)

The information processing apparatus according to (7) above, in which the output control unit controls such that the notification information is not output to the terminal in a case where a situation in which the particular user is placed is a second situation that is predetermined.

(14)

The information processing apparatus according to (13) above, is which the second situation includes a state in which estimated reaching time at a destination of the particular user is later than time according to event start time, a state in which the particular user has a predetermined posture in a train, a state in which a remaining boarding time to a destination of the particular user is shorter than a predetermined time, a state in which tightness of schedule of the particular user exceeds predetermined tightness, a state in which a predetermined period has not elapsed since the particular user purchased a predetermined product, or a state in which a cost corresponding to a type of a train expected to be boarded by the particular user is higher than a predetermined cost.

(15)

The information processing apparatus according to (5) or (6) above, in which each of the first user and the second user has a plurality of sensors, and a weight corresponding to each of the plurality of sensors is associated with the particular user, and the comfort degree calculation unit calculates the first degree of comfort on a basis of sensor data and weights corresponding to the sensors of the first user, and calculates the second degree of comfort on a basis of sensor data and weights corresponding to the sensors of the second user.

(16)

The information processing apparatus according to (15) above, in which a comfort range corresponding to each of the plurality of sensors is associated with the particular user, and the comfort degree calculation unit calculates the first degree of comfort of a basis of a distance from the comfort range to a parameter according to sensor data and the weight corresponding to each of the plurality of sensors of the first user, and calculates the second degree of comfort on a basis of a distance from the comfort range to a parameter according to sensor data and the weight corresponding to each of the plurality of sensors of the second user.

(17)

The information processing apparatus according to (15) or (16) above, in which the output control unit updates a part or all of the weights corresponding to the plurality of respective sensors, is a case where a behavior result of the particular user satisfies a predetermined condition.

(18)

The information processing apparatus according to (17) above, in which the output control unit updates a weight corresponding to a parameter that has changed in a direction in which a degree of comfort increases in correspondence to a change from the first degree of comfort to the second degree of comfort, in a case where it is detected that the particular user has moved to an area where the sensors of the second user are located.

(19)

An information processing method including:

calculating a degree of comfort of a particular user on a basis of sensor data of another user; and controlling, by a processor, such that information regarding the degree of comfort is output to a terminal of the particular user.

(20)

A program for causing a computer to function as an information processing apparatus including:

a comfort degree calculation unit that calculates a degree of comfort of a particular user on a basis of sensor data of another user; and an output control unit that controls such that information regarding the degree of comfort is output to a terminal of the particular user.

REFERENCE SIGNS LIST

1 Information processing system
10 Server (Information processing apparatus)
110 Control unit
112 Data acquisition unit
113 Comfort degree calculation unit
114 Output control unit
120 Storage unit
140 Communication unit
20 Detection apparatus
210 Control unit
230 Storage unit
240 Communication unit
30 Presentation apparatus
310 Control unit
320 Input unit
330 Storage unit
340 Communication unit
350 Presentation unit

The invention claimed is:

1. An information processing apparatus comprising:
   a comfort degree calculation unit configured to calculate a degree of comfort of a particular user based on sensor data of at least one other user; and
   an output control unit configured to control such that information regarding the degree of comfort is output to a terminal of the particular user,
   wherein the comfort degree calculation unit calculates the degree of comfort of the particular user based on comparison of values of a plurality of parameters indicated by the sensor data of the at least one other user and predetermined comfort range values for each parameter of the plurality of parameters associated with the particular user, and
   wherein the comfort degree calculation unit and the output control unit are each implemented via at least one processor.

2. The information processing apparatus according to claim 1,
   wherein a respective weight is associated with the particular user for each respective parameter, and
   wherein the comfort degree calculation unit calculates the degree of comfort based on a value of each respective parameter indicated by the sensor data of the at least one other user and the respective weight associated with the particular user for the respective parameter.

3. The information processing apparatus according to claim 2, further comprising:
   a data acquisition unit configured to acquire position information on a sensor of the at least one other user,
   wherein the output control unit controls such that information regarding an area where the sensor of the at least one other user is located is output to the terminal in association with the information regarding the degree of comfort, and
   wherein the data acquisition unit is implemented via at least one processor.

4. The information processing apparatus according to claim 1,
   wherein the comfort degree calculation unit calculates a first degree of comfort of the particular user based on sensor data of a first user, and a second degree of comfort of the particular user based on sensor data of a second user.

5. The information processing apparatus according to claim 4, further comprising:
   a data acquisition unit configured to acquire position information on a sensor of the first user and position information on a sensor of the second user,
   wherein the output control unit controls such that information regarding an area where the sensor of the first user is located is output to the terminal in association with the first degree of comfort, and controls such that information regarding an area where the sensor of the second user is located is output to the terminal in association with the second degree of comfort, and
   wherein the data acquisition unit is implemented via at least one processor.

6. The information processing apparatus according to claim 4, further comprising:
   a data acquisition unit configured to acquire position information on the particular user, position information on a sensor of the first user, and position information on a sensor of the second user,
   wherein in a case where the position information on the particular user and the position information on the first user have a predetermined relationship, and a difference obtained by subtracting the first degree of comfort from the second degree of comfort exceeds a threshold value, the output control unit controls such that notification information that is predetermined is output to the terminal, and
   wherein the data acquisition unit is implemented via at least one processor.

7. The information processing apparatus according to claim 6,
   wherein the output control unit controls the threshold value according to a situation in which the particular user is placed.

8. The information processing apparatus according to claim 7,
   wherein the output control unit updates the threshold value in a case where a behavior result of the particular user satisfies a predetermined condition.

9. The information processing apparatus according to claim 8,
   wherein the output control unit updates the threshold value in a case where it is detected that the particular user has moved to an area where the sensor of the second user is located.

10. The information processing apparatus according to claim 7,
    wherein the output control unit sets the threshold value to a predetermined value in a case where a situation in which the particular user is placed is a first situation.

11. The information processing apparatus according to claim 10,
    wherein the first situation includes a state in which the particular user is located at a platform of a station, a state in which the particular user is riding on a train, or a state in which a person located in a vicinity of the particular user is a predetermined person.

12. The information processing apparatus according to claim 7,
    wherein the output control unit controls the threshold value based on at least one of a remaining boarding time to a destination of the particular user, a cost corresponding to a type of a train expected to be boarded by the particular user, tightness of schedule of the particular user, a product purchase history of the particular user, a person located in a vicinity of the particular user, or a posture of the particular user in a train.

13. The information processing apparatus according to claim 7,
    wherein the output control unit controls such that the notification information is not output to the terminal in a case where a situation in which the particular user is placed is a second situation that is predetermined.

14. The information processing apparatus according to claim 13,
    wherein the second situation includes a state in which estimated reaching time at a destination of the particular user is later than time according to event start time, a state in which the particular user has a predetermined posture in a train, a state in which a remaining boarding time to a destination of the particular user is shorter than a predetermined time, a state in which tightness of schedule of the particular user exceeds predetermined tightness, a state in which a predetermined period has not elapsed since the particular user purchased a predetermined product, or a state in which a cost corresponding to a type of a train expected to be boarded by the particular user is higher than a predetermined cost.

15. The information processing apparatus according to claim 5,
wherein each of the first user and the second user has a plurality of sensors, and a weight corresponding to each of the plurality of sensors is associated with the particular user, and
wherein the comfort degree calculation unit calculates the first degree of comfort based on sensor data and weights corresponding to the sensors of the first user, and calculates the second degree of comfort based on sensor data and weights corresponding to the sensors of the second user.

16. The information processing apparatus according to claim 15,
wherein a comfort range corresponding to each of the plurality of sensors is associated with the particular user, and
wherein the comfort degree calculation unit calculates the first degree of comfort based on a distance from the comfort range to a parameter according to sensor data and the weight corresponding to each of the plurality of sensors of the first user, and calculates the second degree of comfort based on a distance from the comfort range to a parameter according to sensor data and the weight corresponding to each of the plurality of sensors of the second user.

17. The information processing apparatus according to claim 15, wherein
the output control unit updates a part or all of the weights corresponding to the plurality of respective sensors, in a case where a behavior result of the particular user satisfies a predetermined condition.

18. The information processing apparatus according to claim 17, wherein
the output control unit updates a weight corresponding to a parameter that has changed in a direction in which a degree of comfort increases in correspondence to a change from the first degree of comfort to the second degree of comfort, in a case where it is detected that the particular user has moved to an area where the sensors of the second user are located.

19. An information processing method comprising:
calculating a degree of comfort of a particular user based on sensor data of at least one other user; and
controlling, by a processor, such that information regarding the degree of comfort is output to a terminal of the particular user,
wherein the degree of comfort of the particular user is calculated based on comparison of values of a plurality of parameters indicated by the sensor data of the at least one other user and predetermined comfort range values for each parameter of the plurality of parameters associated with the particular user.

20. A non-transitory computer-readable storage medium having embodied thereon a program, which when executed by a computer causes the computer to execute a method, the method comprising:
calculating a degree of comfort of a particular user based on sensor data of at least one other user; and
controlling such that information regarding the degree of comfort is output to a terminal of the particular user,
wherein the degree of comfort of the particular user is calculated based on comparison of values of a plurality of parameters indicated by the sensor data of the at least one other user and predetermined comfort range values for each parameter of the plurality of parameters associated with the particular user.

* * * * *